US009113192B2

(12) United States Patent
Nishio

(10) Patent No.: US 9,113,192 B2
(45) Date of Patent: Aug. 18, 2015

(54) VIDEO PROCESSOR

(71) Applicant: PANASONIC CORPORATION, Osaka (JP)

(72) Inventor: Yuuki Nishio, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 532 days.

(21) Appl. No.: 13/644,636

(22) Filed: Oct. 4, 2012

(65) Prior Publication Data

US 2013/0028337 A1 Jan. 31, 2013

Related U.S. Application Data

(63) Continuation of application No. PCT/JP2010/007093, filed on Dec. 6, 2010.

(30) Foreign Application Priority Data

Apr. 19, 2010 (JP) .................................. 2010-096146

(51) Int. Cl.
*H04N 21/43* (2011.01)
*G09G 5/00* (2006.01)
*G09G 5/18* (2006.01)

(52) U.S. Cl.
CPC ........... *H04N 21/4302* (2013.01); *G09G 5/006* (2013.01); *G09G 5/18* (2013.01); *G09G 2340/0407* (2013.01); *G09G 2360/02* (2013.01); *G09G 2370/12* (2013.01)

(58) Field of Classification Search
None
See application file for complete search history.

(56) References Cited

U.S. PATENT DOCUMENTS

2005/0286643 A1   12/2005   Ozawa et al.
2009/0047001 A1*   2/2009   Kojima ......................... 386/124
2009/0278984 A1   11/2009   Suzuki et al.

FOREIGN PATENT DOCUMENTS

JP          3017240 U        10/1995

OTHER PUBLICATIONS

International Search Report issued in International Patent Application No. PCT/JP2010/007093 dated Mar. 15, 2011.

* cited by examiner

*Primary Examiner* — Dave Czekaj
*Assistant Examiner* — Nam Pham
(74) *Attorney, Agent, or Firm* — McDermott Will & Emery LLP

(57) ABSTRACT

A video processor receives original video data, an original synchronization signal, and an original data valid region signal from a video signal source, supplements insufficient part of the original video data relative to a predetermined valid pixel region, and outputs new video data having the predetermined valid pixel region and a new data valid region signal indicating the predetermined valid pixel region. The video processor includes a valid position regeneration controller delaying at least one of the original video data or the original synchronization signal to match positions of color-difference signals in the original video data to positions of color-difference signals in the new video data in determining based on the original synchronization signal and the original data valid region signal that the color-difference signals in the new video data are displayed while being replaced with each other; and a controller controlling operation of the valid position regeneration controller.

31 Claims, 27 Drawing Sheets

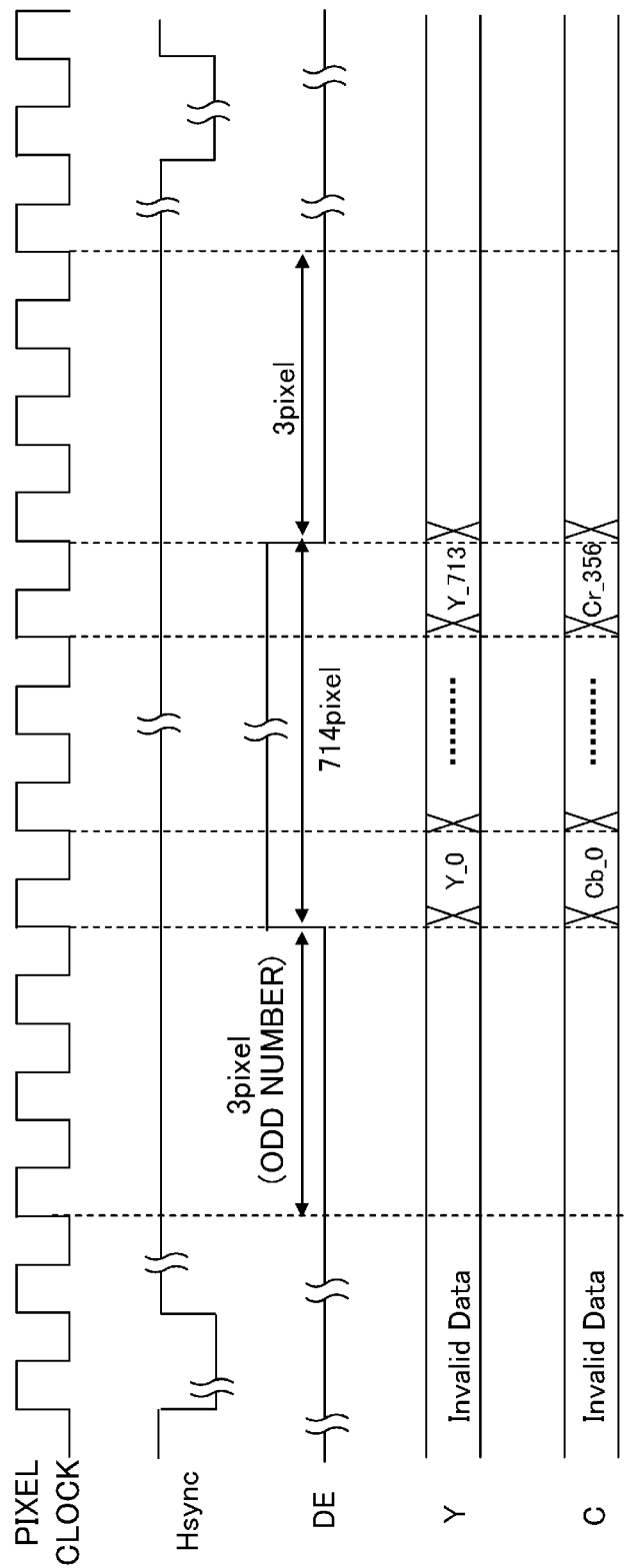

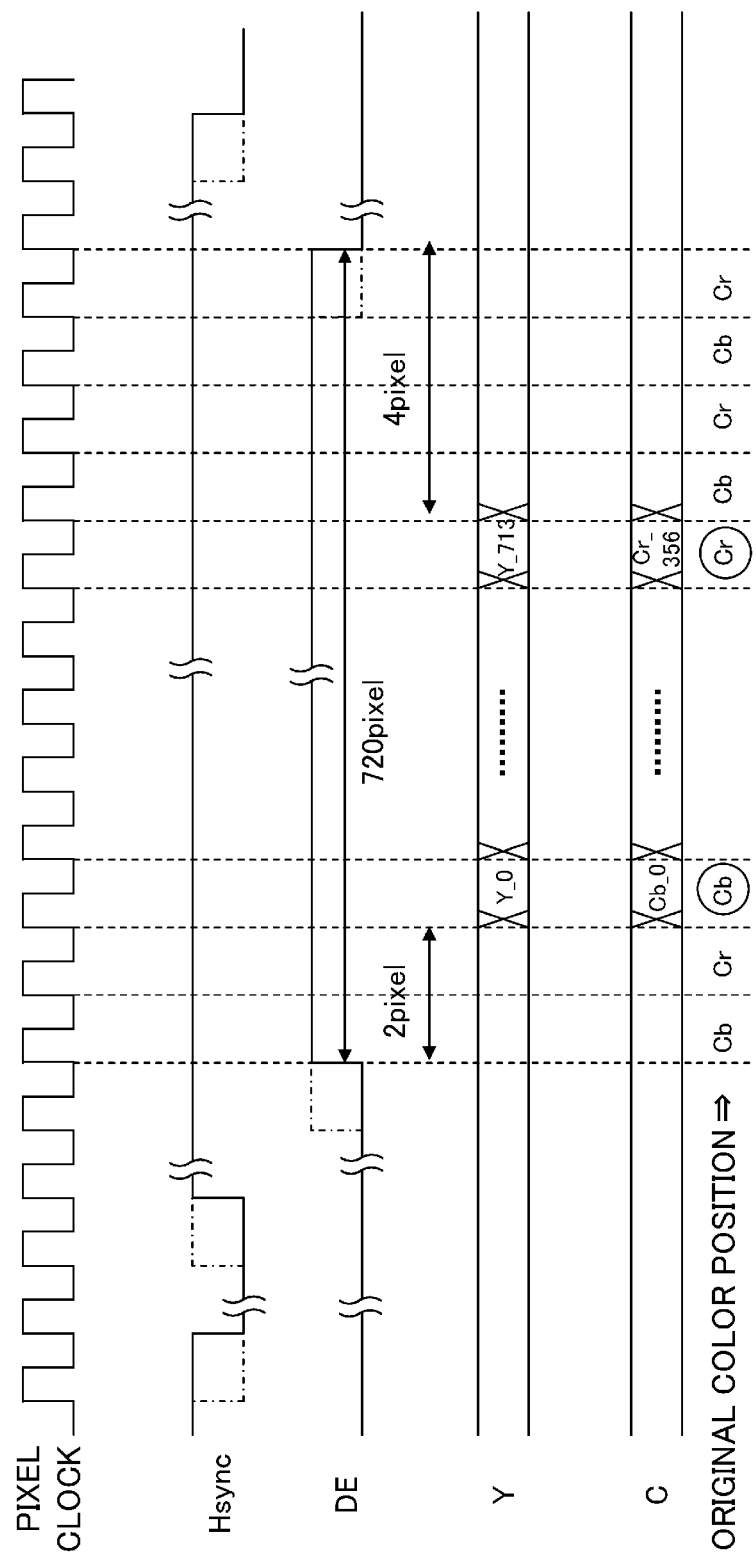

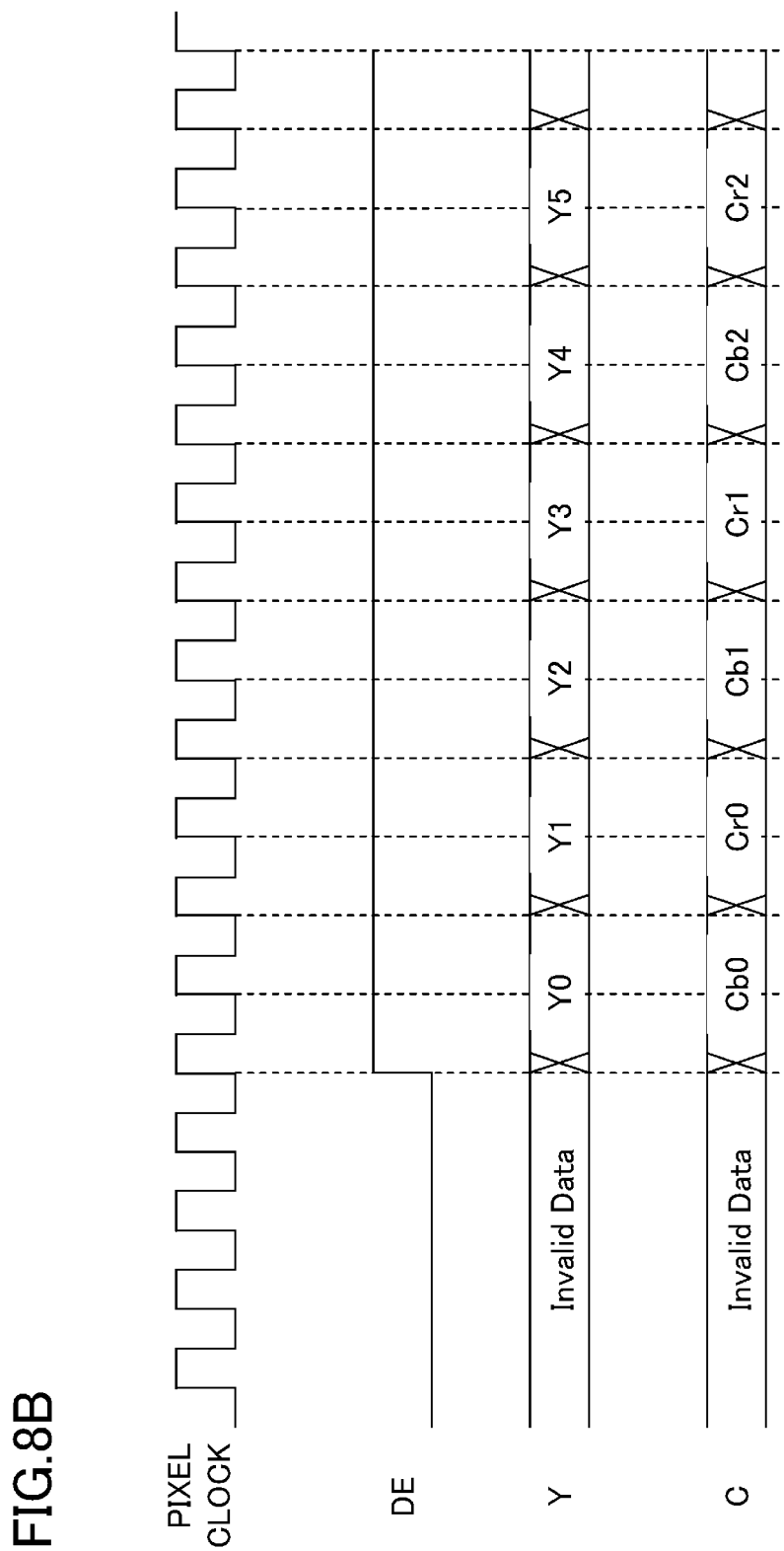

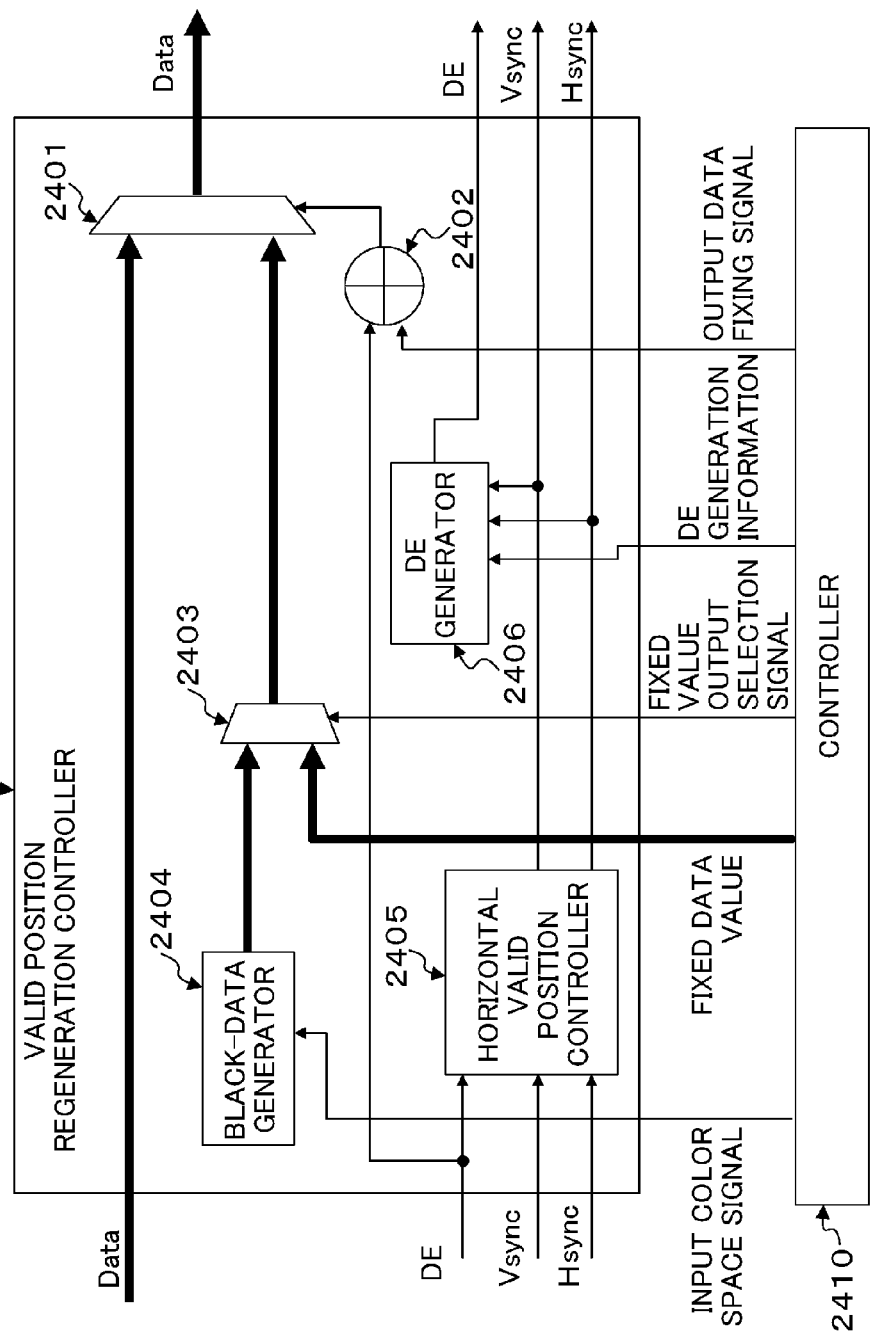

VIDEO PROCESSOR

CROSS-REFERENCE TO RELATED APPLICATION

This is a continuation of PCT International Application PCT/JP2010/007093 filed on Dec. 6, 2010, which claims priority to Japanese Patent Application No. 2010-096146 filed on Apr. 19, 2010. The disclosures of these applications including the specifications, the drawings, and the claims are hereby incorporated by reference in their entirety.

BACKGROUND

The present disclosure relates to video processors, and more particularly to video processors according to a High Definition Multimedia Interface (HDMI) standard and systems using the video processors.

According to the HDMI standard, in which a high-definition image is transmitted as uncompressed digital data, the data transmitted from a transmitter needs to meet the CEA-861 standard, which is the standard for uncompressed digital video. The CEA-861 standard defines a valid pixel region in horizontal and vertical directions.

Where data having a smaller valid pixel region than the valid pixel region defined by the CEA-861 standard is input to an HDMI transmitter circuit, insufficient pixels relative to the valid pixel region according to the CEA-861 standard are colored black and then the data is output. For example, where 714-pixel data is input to a horizontal valid region of 720 pixels according to the CEA-861 standard, three pixels on each of the right and left in the horizontal direction are colored black, and then the data is output.

However, according to the HDMI standard, when color-difference signals are transmitted from a transmitter in the form of Cb0, Cr0, Cb1, . . . , the receiver recognizes that the signals start from Cb. That is, where the odd number of pixels are colored black on each of the right and left sides in the horizontal direction, as described above, the receiver recognizes the inverted version of the original color-difference signals.

A conventional television signal processor includes a horizontal compression circuit for automatically determining the aspect ratio of 4:3 (normal) or 16:9 (wide) in a wide-screen television and for efficiently utilizing the display as much as possible. However, this television signal processor fails to solve the problem occurring in coloring black, insufficient pixels for a valid pixel region according to the CEA-861 standard to output data.

Therefore, there is a need for a video processor, which outputs video data not causing color inversion at a receiver, even if a pixel region of input video data has a size out of the specification.

SUMMARY

According to an aspect of the present disclosure, a video processor receives, from a video signal source, original video data including color-difference data formed by alternately arranging first and second color-difference signals, an original synchronization signal indicating synchronization timing of the original video data, and an original data valid region signal indicating a valid pixel region of the original video data, supplements insufficient part of the original video data relative to a predetermined valid pixel region, and outputs new video data having the predetermined valid pixel region, and a new data valid region signal indicating the predetermined valid pixel region. The video processor includes a valid position regeneration controller configured to delay at least one of the original video data or the original synchronization signal to match data positions of the first and second color-difference signals in the original video data to data positions of first and second color-difference signals in the new video data in determining based on the original synchronization signal and the original data valid region signal that the first and second color-difference signals in the new video data are displayed while being replaced with each other; and a controller configured to control operation of the valid position regeneration controller.

With this configuration, when it is determined that the first and second color-difference signals of the new video data, which has the predetermined valid pixel region obtained by supplementing the insufficient part of the original video data input from the video signal source, are switched to be displayed, at least one of the original video data or the original synchronization signal is delayed to match the data positions of the first and second color-difference signals in the original video data to the data positions of the first and second color-difference signals in the new video data. This supplements the insufficient part of the original video data relative to the predetermined valid pixel region so that a receiver accurately recognizes the order of the first and second color-difference signals of the new video data, and outputs the new video data.

BRIEF DESCRIPTION OF THE DRAWINGS

The figures depict one or more implementations in accord with the present teachings, by way of example only, not by way of limitations. In the figures, like reference numerals refer to the same or similar elements.

FIGS. 3A and 3B illustrate exemplary input and output timing of data in an input video controller;

FIGS. 8A and 8B illustrate exemplary timing of a clock and synchronization signals in different numbers of repetition;

FIG. 24 illustrates an exemplary configuration of a valid position regeneration controller according to a ninth embodiment.

DETAILED DESCRIPTION

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

First Embodiment

Figure 1:
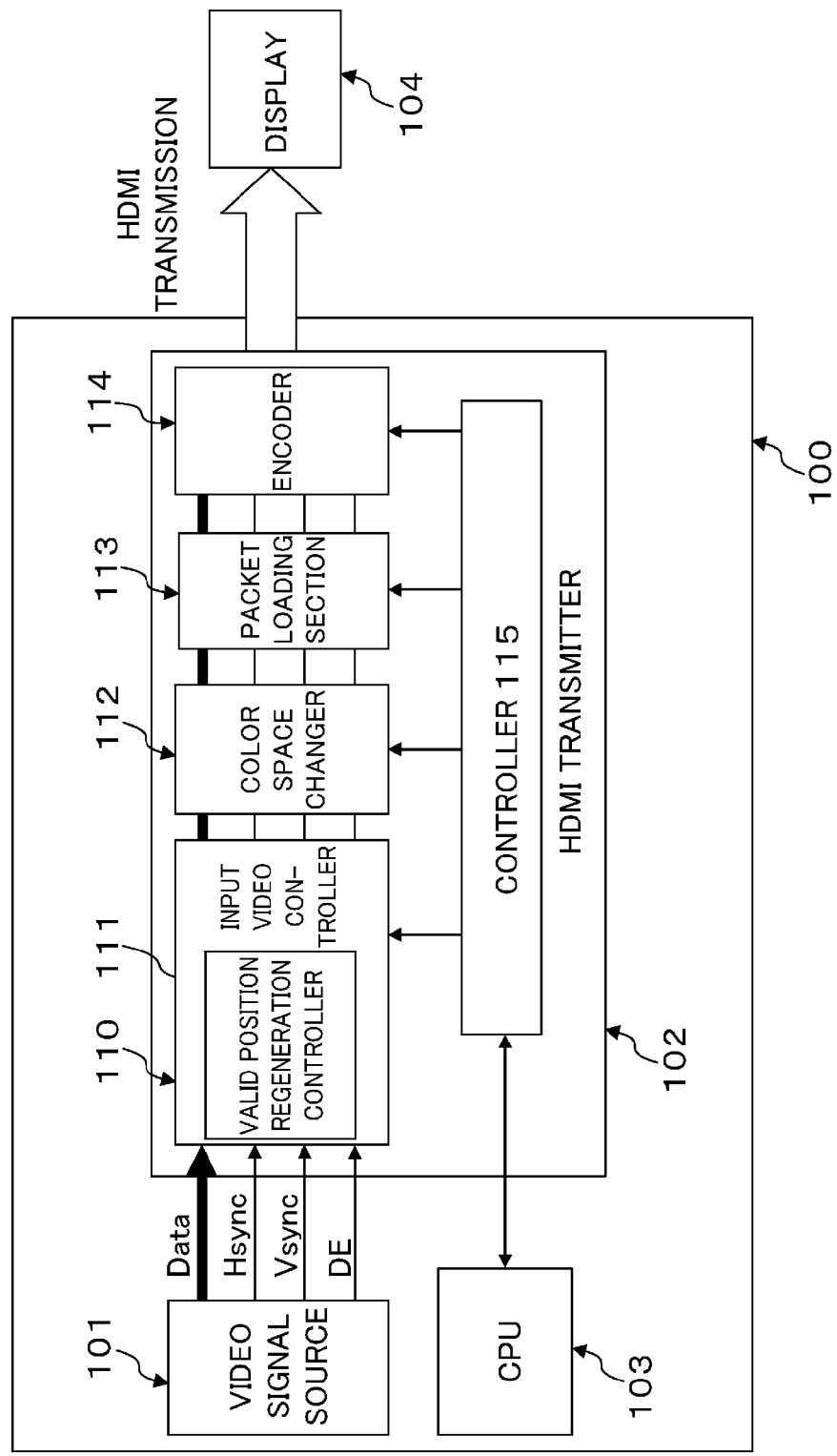
FIG. 1 illustrates an exemplary configuration of video equipment according to the present disclosure.

FIG. 1 illustrates a video equipment 100 such as a player of games, Blu-ray disks, DVDs, etc., a recorder, etc. In the video equipment 100, video data is sent from a video signal source 101 to an HDMI transmitter 102. A CPU 103 controls the video equipment 100 as a whole. In particular, with respect to a game player, a game producer may dare to dynamically change and freely set the valid pixel region of video data. The video data output from the HDMI transmitter 102 is sent to an HDMI receiver and displayed by a display 104.

The HDMI transmitter 102 includes an input video controller 110 generating the input video data, a data valid enable signal, etc., a color space changer 112 changing the color space of the input video data, a packet loading section 113 loading audio data and a control packet in a blank period of the video data, and an encoder 114 converting, for example, 8-bit data to a 10-bit code for differential transmission in transmitting the data and equalizing the DC balance in a differential line. The HDMI transmitter 102 further includes a controller 115 controlling the input video controller 110, the color space changer 112, the packet loading section 113, and the encoder 114. The CPU 103 controls the controller 115. Note that the HDMI transmitter 102 is not limited to this configuration.

After receiving video data from the video signal source 101, a valid position regeneration controller 111 included in the input video controller 110 determines whether or not color inversion occurs in outputting data having a valid pixel region different from the valid pixel region according to the CEA-861 standard, based on the relationship between a horizontal synchronization signal (hereinafter referred to as Hsync) and a data valid region signal (hereinafter referred to as DE). Specifically, the valid position regeneration controller 111 determines whether or not the color inversion occurs by, for example, counting the number of clock cycles between the falling position of Hsync and the rising position of DE.

As a result of the determination, if it is a condition that color inversion occurs, a vertical synchronization signal (hereinafter referred to as Vsync) and Hsync are shifted to positions not causing color inversion. Note that Hsync and Vsync are corrected at the same time. This is because, if only the position of Hsync were corrected, the relationship between Hsync and Vsync would be mined and would not meet the CEA-861 standard.

For example, where video data of 714 pixels are input against a horizontal valid region of 720 pixels according to the CEA-861 standard, 2 pixels on the left and 4 pixels on the right are colored black in the horizontal direction. Then, the video data is output.

Moreover, the video data is shifted to a position not causing color inversion, and the valid position regeneration controller 111 reproduces DE according to the CEA-861 standard from Hsync and Vsync, which are input, and outputs DE to a subsequent stage. This allows the HDMI transmitter 102 to transmit a video synchronization signal according to the CEA-861 standard without causing color inversion.

In the present disclosure, an example has been described where Vsync, Hsync, and DE are input as the synchronization signals. However, as in REC656 etc., synchronization signals such as a Hsync and a Vsync may not be input and synchronization signal information may be loaded in a blank period of a data region. A signal identifying Cb/Cr may be included and synchronization signal information may be loaded in a blank region of data.

The present disclosure assumes that Vsync and Hsync meet the CEA-861 standard. However, where Vsync and Hsync not meeting the CEA-861 standard are input, the signals may be formed in accordance with the CEA-861 standard in a stage previous to the valid position regeneration controller 111 in, for example, the input video controller 110, and then input. That is, the present disclosure is not limited to the case where Vsync and Hsync according to the CEA-861 standard are input.

Figure 2:
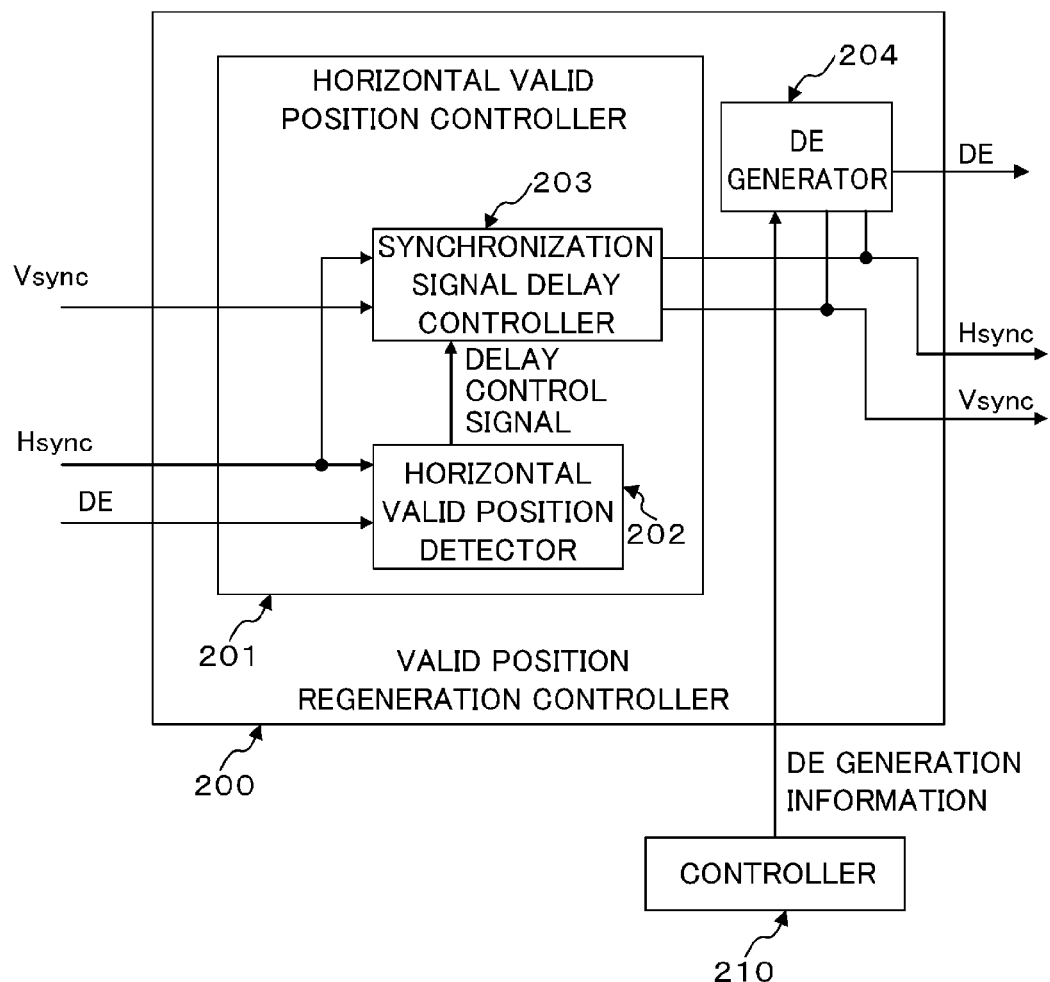
FIG. 2 illustrates an exemplary configuration of a valid position regeneration controller according to a first embodiment.

The valid position regeneration controller 111 of FIG. 1 according to this embodiment is shown in FIG. 2 as a valid position regeneration controller 200. The valid position regeneration controller 200 includes a horizontal valid position controller 201. The horizontal valid position controller 201 includes a horizontal valid position detector 202 and a synchronization signal delay controller 203.

The horizontal valid position detector 202 determines whether or not it is time that color inversion occurs, when insufficient pixels relative to the valid pixel region according to the CEA-861 standard are colored black and data is output, based on the relationship between Hsync or Vsync and DE. The synchronization signal delay controller 203 delays Hsync and Vsync based on the determination result. A DE generator 204 generates DE according to the CEA-861 standard for Sync, which is output from the synchronization signal delay controller 203, and outputs DE to a subsequent stage.

Note that the CPU 103 knows the format for HDMI transmission. DE generation information is sent from the CPU 103 to DE generator 204 via a controller 210, thereby generating DE according to the CEA-861 standard.

FIGS. 3A and 3B illustrate input/output timing of data in the input video controller included in the video equipment where data of 714 pixels is input, which are 6 pixels fewer than 720 pixels of a horizontal valid region according to the CEA-861 standard. FIG. 3A illustrates input timing in the input video controller 110. FIG. 3B illustrates output timing in the input video controller 110.

First, in FIG. 3A, Hsync and DE are input in synchronization with a pixel clock. The horizontal valid region of the input data has 714 pixels, which are 3 pixels fewer than the horizontal valid region according to the CEA-861 standard on each of the right and left. Since the horizontal valid region of the input data has 714 pixels, Y data ranges from Y_0 to Y_713. In FIG. 3A, Y_0 data starts 3 pixels later than the CEA-861 standard on the left and, Y_713 data ends 3 pixels earlier than the CEA-861 standard on the right. With respect to C data, color-difference signals start 3 pixels later than the CEA-861 standard on the left in the form of Cb_0, Cr_0, Cb_1, Cr_1, . . . , and end with Cr_356, i.e., 3 pixels earlier than the CEA-861 standard on the right.

The horizontal valid position detector 202 of FIG. 2 determines whether or not the input data has the horizontal valid pixel region causing color inversion based on Hsync and DE. The determination result is transmitted to the synchronization signal delay controller 203 as a delay control signal. The synchronization signal delay controller 203 receives the delay control signal and delays Hsync and Vsync by 1 clock cycle. Since a DE generator 204 generates DE for Hsync and Vsync, which are delayed by 1 clock cycle, DE is output after a delay of 1 clock cycle relative to the case not employing the present disclosure.

In FIG. 3B, Hsync, which is indicated by the solid line, is output in synchronization with the pixel clock output from the input video controller 110. The Hsync is delayed by 1 clock cycle relative to Hsync, which does not correspond to the present disclosure and is indicated by the dotted line. DE is generated for Hsync and Vsync, which are delayed by 1 clock cycle. Thus, DE, which is indicated by the solid line, is output from the input video controller 110 of the present disclosure after a delay of 1 clock cycle relative to DE, which does not correspond to the present disclosure and is indicated by the dotted line. As a result, the initial data of the output Y and output C is transmitted to a subsequent stage after a delay of two pixels on the left relative to the output DE. Therefore, the initial data Cb_0 of the output C is located in the position of the original color-difference signal Cb according to the HDMI standard, and thus the position of the Cb according to the HDMI is the same as the position of the output Cb, thereby avoiding color inversion.

Figure 4:
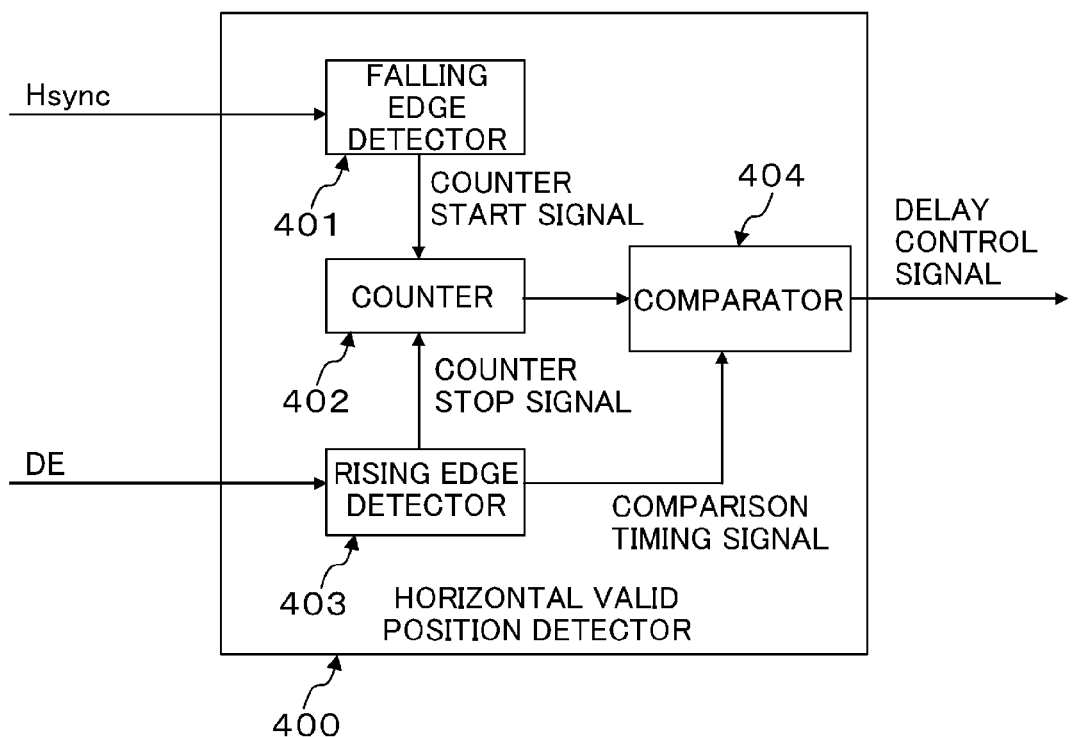
FIG. 4 illustrates an exemplary configuration of a horizontal valid position detector according to the present disclosure.

FIG. 4 illustrates an exemplary configuration of the horizontal valid position detector 202 included in the valid position regeneration controller 200 of FIG. 2. Hsync input to a horizontal valid position detector 400 is input to a falling edge detector 401 detecting falling edges. After detecting the falling edge of Hsync, the falling edge detector 401 notifies a counter 402 of the detection result as a counter start signal. Upon receipt the notice, the counter 402 clears a count value and counts up based on the pixel clock.

DE input to the horizontal valid position detector 400 is input to a rising edge detector 403 detecting rising edges. If the rising edge detector 403 detects the rising edge of DE, the detection result is input to the counter 402 as a counter stop signal. Then, the counter 402 stops counting. If the rising edge detector 403 detects the rising edge of DE, the detection result is also input to a comparator 404 as a comparison timing signal. Where the counter value is an odd number, the rising edge detector 403 outputs 1 as a delay control signal, since it is time that color inversion occurs. Where the counter value is an even number, the rising edge detector 403 outputs 0 as a delay control signal, since it is not the time that color inversion occurs.

Figure 5:
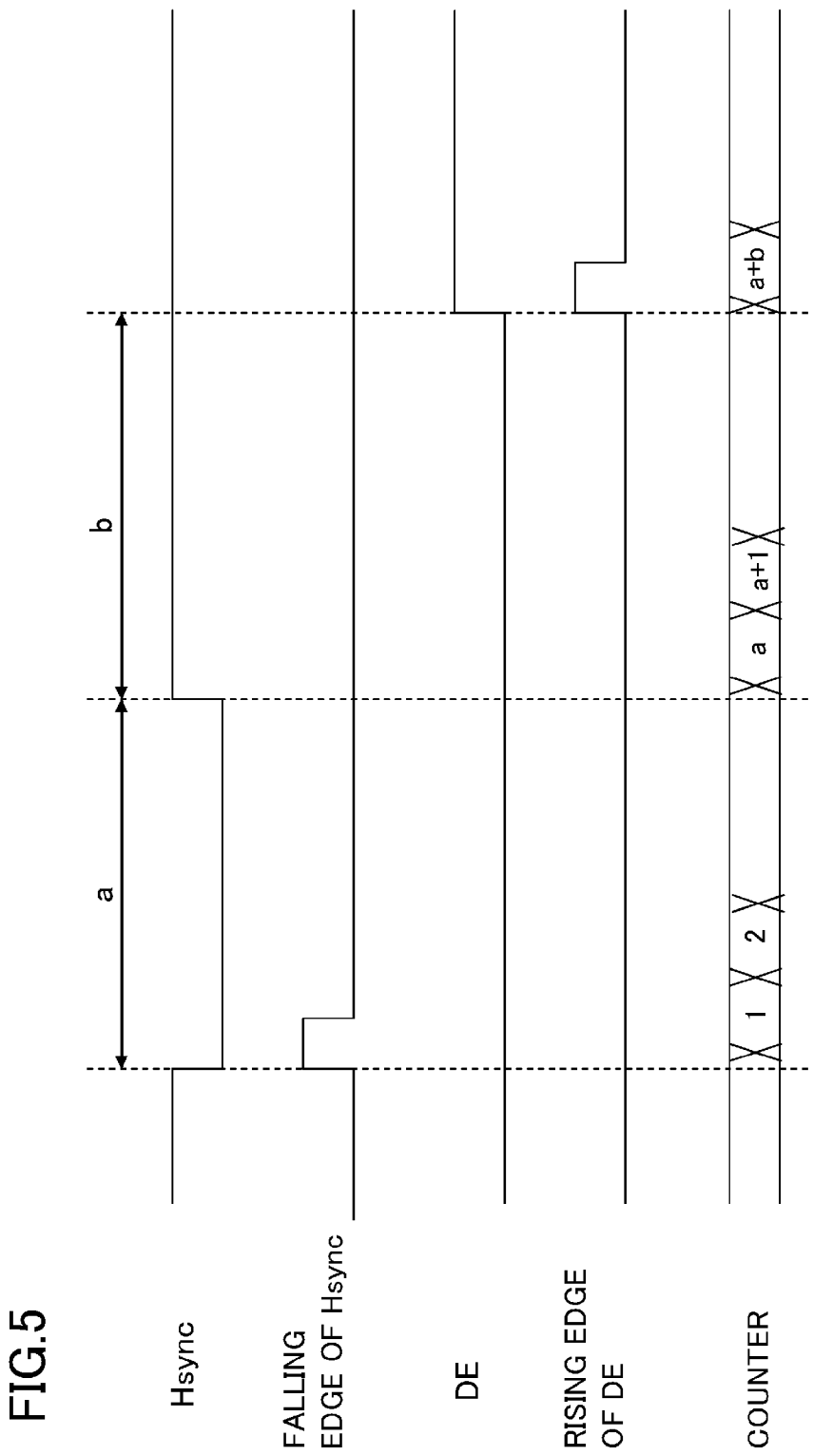
FIG. 5 illustrates exemplary input and output timing of data in the horizontal valid position detector according to the present disclosure.

FIG. 5 illustrates exemplary operation timing of the horizontal valid position detector 400. Assume that the period in which Hsync is 0 is a, and the period between the rising of Hsync and the rising of DE is b. According to the CEA-861 standard, the sum of the counts in the periods a and b is an even number.

The counter 402 starts counting at the falling edge of Hsync, and counts up in each pixel clock cycle. Next, the counter 402 stops counting at the rising edge of DE, and the horizontal valid position detector 400 determines whether or not the value of the counter 402 is an even number at the same time. Specifically, where the value a+b of the counter 402 is an even number, the horizontal valid position detector 400 determines that it is not a condition that color inversion occurs, and outputs 0.

Assume that the period between the rising of Hsync and the rising of DE is b+1. If the counter 402 starts counting at the falling edge of Hsync and stops counting at the rising edge of DE, the value of the counter 402 is a+b+1, which is an odd number. Thus, the horizontal valid position detector 400 determines that it is a condition that color inversion occurs, and outputs 1.

As such, the clock cycles are counted in the period between the falling edge of Hsync and the rising edge of DE, thereby determining whether or not color inversion occurs.

Where Hsync and DE have signal polarities opposite to those of FIG. 5, the falling edge detector 401 in FIG. 4 may be replaced with a rising edge detector, and the rising edge detector 403 may be replaced with a falling edge detector.

First Variation of Horizontal Valid Position Detector

Figure 6:
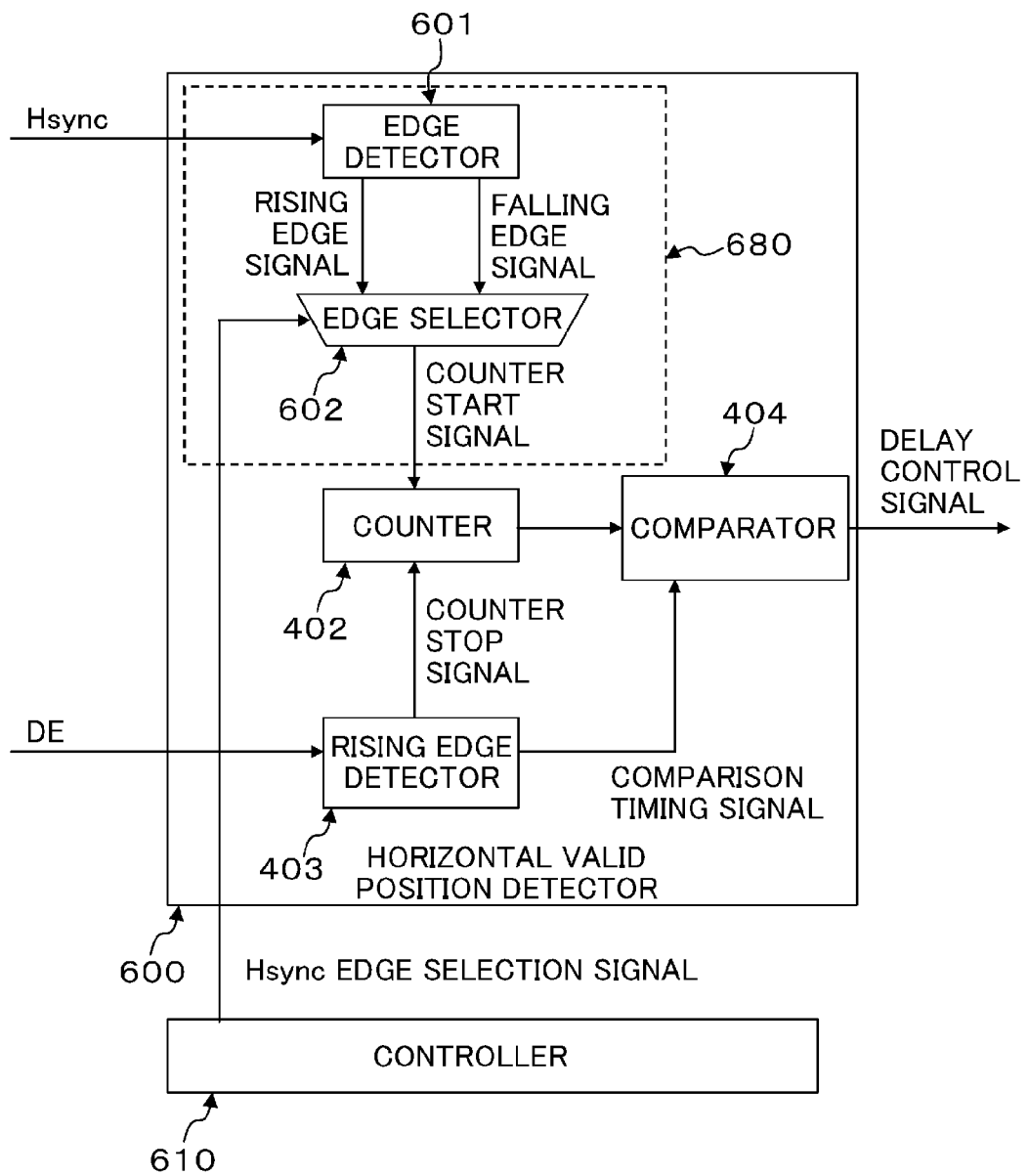
FIG. 6 illustrates an exemplary configuration of a first variation of the horizontal valid position detector according to the present disclosure.

A first variation of the horizontal valid position detector according to the present disclosure will be described below with reference to FIG. 6. FIG. 6 shows a controller 610 in addition to a horizontal valid position detector 600.

The polarity of Hsync may change between positive and negative polarities depending on the format input to the input video controller 110, the specification of the video signal source 101, etc. Thus, the polarity of Hsync is freely set by the CPU 103 so that the horizontal valid position detector corresponds to both of the positive and negative polarities. Note that the horizontal valid position detector knows which polarity Hsync has when being output from the video signal source 101.

In FIG. 6, the horizontal valid position detector 600 includes a synchronization signal edge detector 680. The synchronization signal edge detector 680 includes an edge detector 601 capable of detecting the rising and falling of the input Hsync. The edge detector 601 outputs both of rising edge signals and falling edge signals. The synchronization signal edge detector 680 also includes an edge selector 602, which selects a rising edge signal or a falling edge signal when an Hsync edge selection signal is set by the controller 610. After detecting the rising edge or the falling edge of Hsync in accordance with the rising edge signal or the falling edge signal set by the edge selection signal, the edge selector 602 notifies the counter 402 of the detection result as a counter start signal. Upon receipt of the notice, the counter 402 clears the count value, and counts up based on the pixel clock.

As such, the counter start signal can be output to the counter 402 by properly setting the edge signal corresponding to the polarity of the input Hsync.

Second Variation of Horizontal Valid Position Detector

Figure 7:
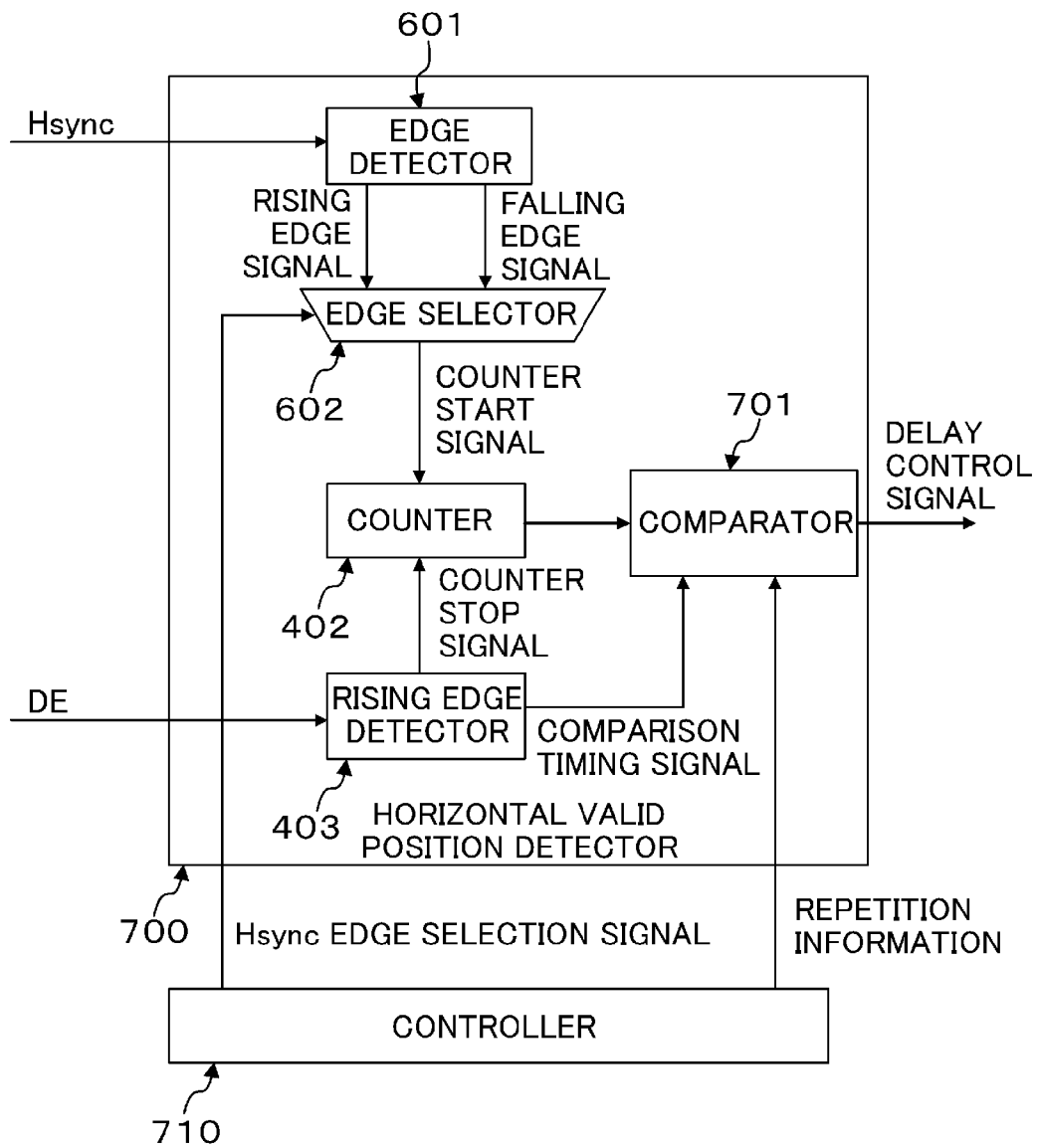
FIG. 7 illustrates an exemplary configuration of a second variation of the horizontal valid position detector according to the present disclosure.

A second variation of the horizontal valid position detector according to the present disclosure will be described below with reference to FIG. 7. FIG. 7 shows a controller 710 in addition to a horizontal valid position detector 700.

The number of repetition of data may change depending on the input format, the specification of the video signal source 101, etc. Thus, repetition information is freely set by the CPU 103 so that the horizontal valid position detector corresponds to a change in the number of repetition of the input data. Note that the horizontal valid position detector knows at which time of repetition the video signal source 101 outputs the data.

In FIG. 7, the controller 710 notifies a comparator 701 included in the horizontal valid position detector 700 of repetition information, thereby changing comparison operation of the counter 402 in accordance with the repetition information. This precisely reflects whether or not accurate color inversion occurs even if the number of repetition of data, which is input to the input video controller 110, changes.

While in FIG. 7, an Hsync edge selection signal is input from the controller 710, the above-described advantages may be also provided even if the Hsync edge selection signal is not input.

Figure 8A:
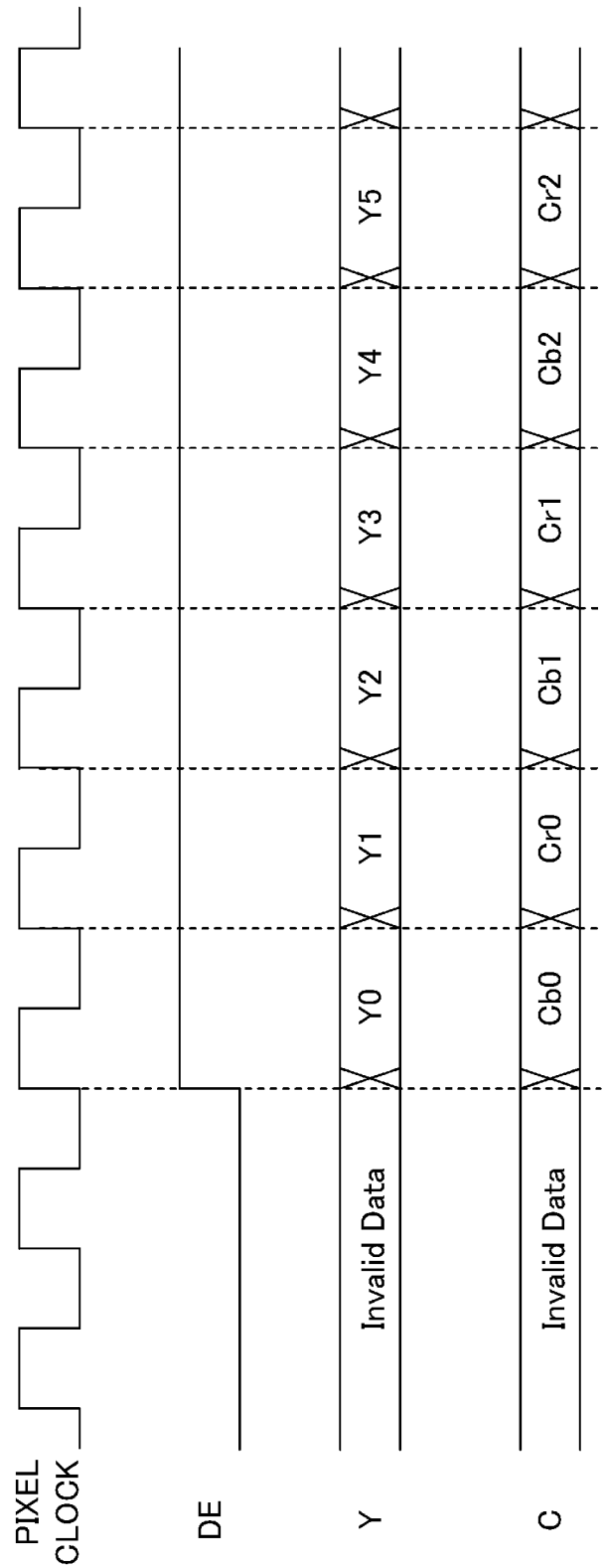

FIG. 8A illustrates the relationship among data, a clock, and synchronization signals where there is no repetition, i.e., where the number of repetition is 0. FIG. 8B illustrates the relationship among data, a clock, and synchronization signals where the number of repetition is 2.

Where the number of repetition is 0, one piece of data is sent in every one clock cycle. That is, as shown in FIG. 8A, Y data and C data are updated in every one clock cycle of a pixel clock. On the other hand, where the number of repetition is 2, one piece of data is sent in every two clock cycles. That is, as shown in FIG. 8B, the Y data and the C data are updated in every two clock cycles of the pixel clock. That is, the repetition information indicates in every how many clock cycles the Y data and the C data are updated.

Figure 9A:
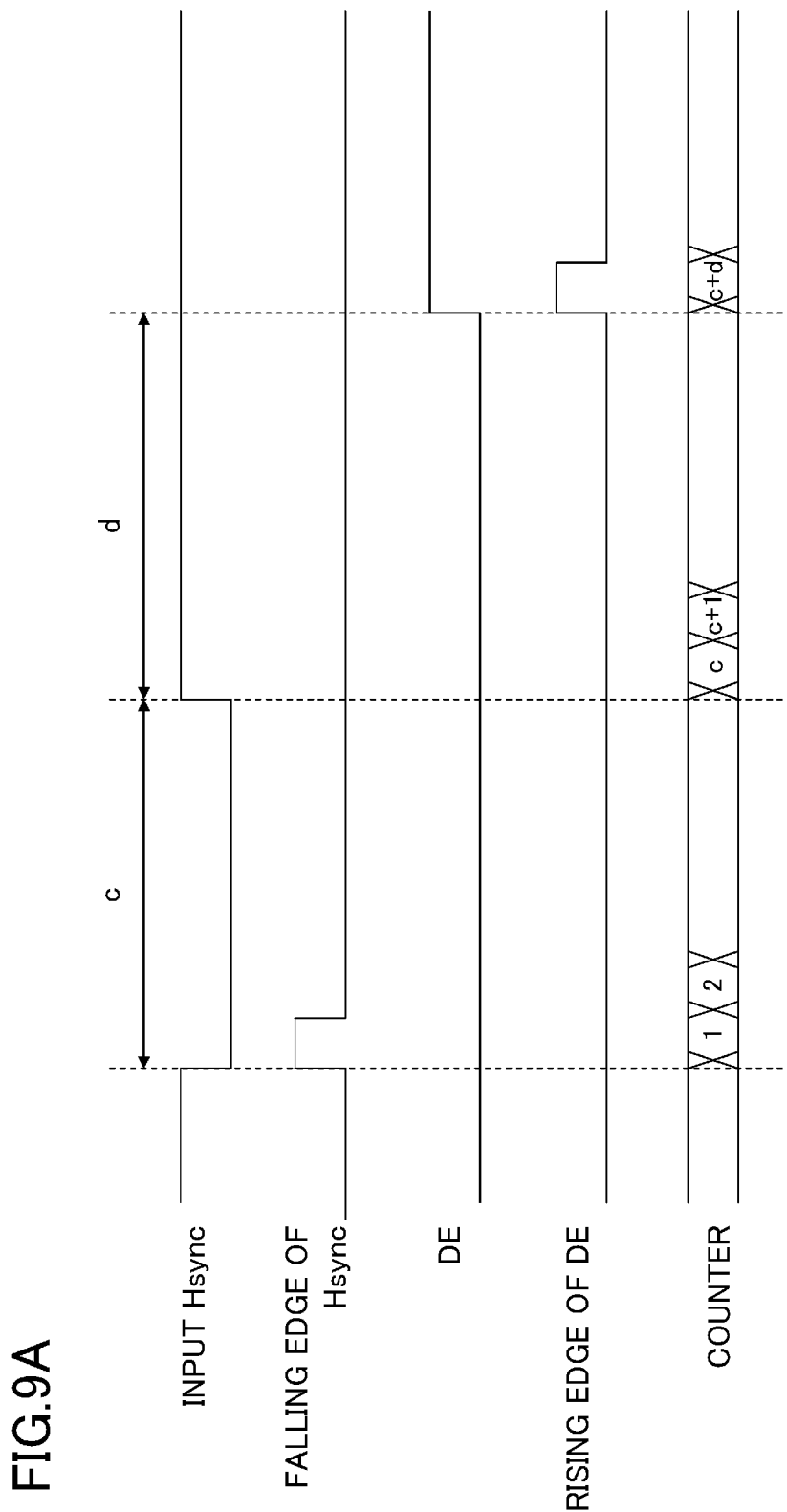
FIGS. 9A and 9B illustrate exemplary input and output timing of data in the horizontal valid position detector according to the present disclosure.
Figure 9B:
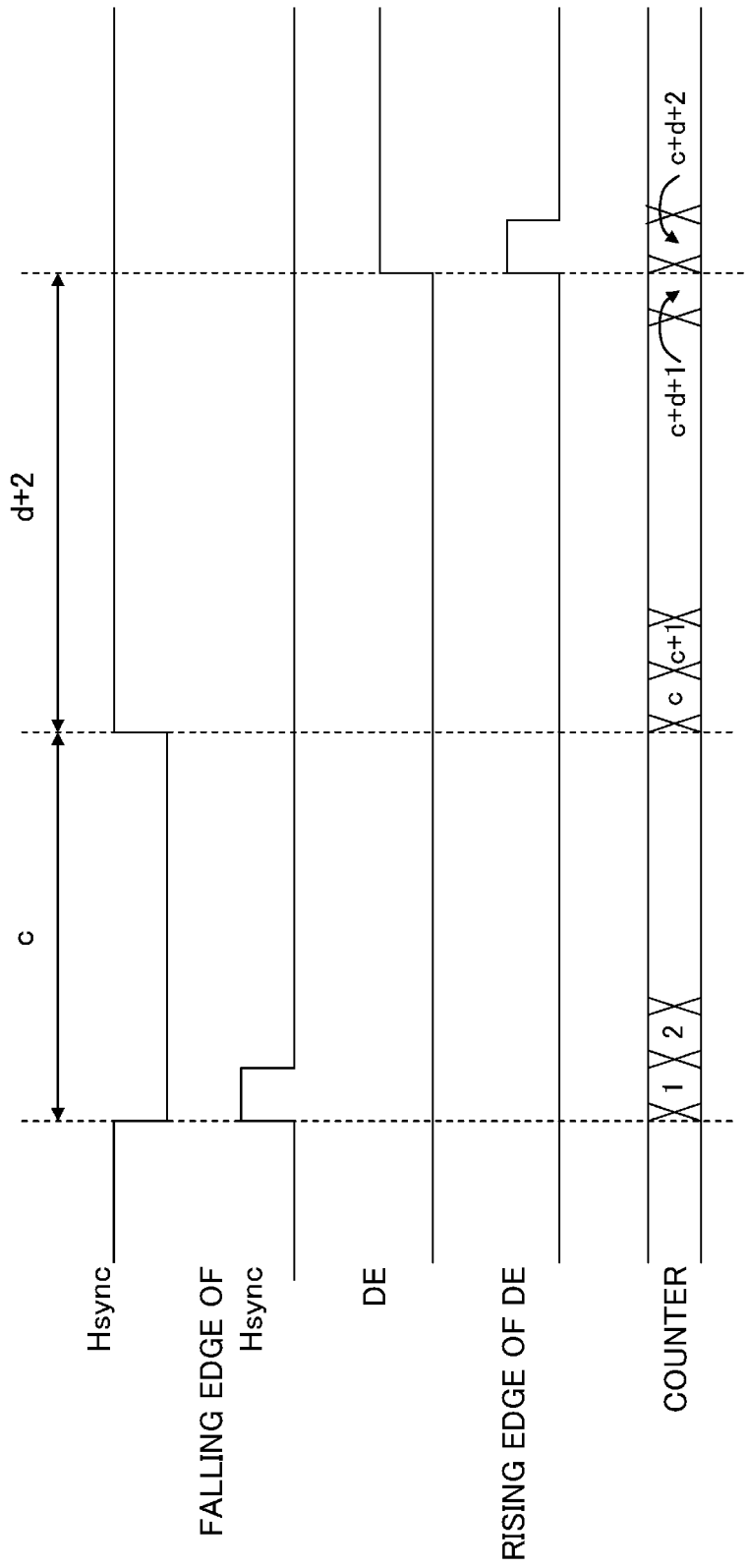

FIGS. 9A and 9B illustrate operation timing of the horizontal valid position detector, where the number of repetition is 2. In FIG. 9A, the period in which the input Hsync is 0 is c, and the period between the rising of Hsync and the rising of DE is d. According to the CEA-861 standard, (c+d)/2 is an even number.

The counter 402 starts counting at the falling edge of Hsync, and counts up in every pixel clock cycle. Next, when the counter 402 stops counting at the rising edge of DE, the value of the counter 402 is c+d, and (c+d)/2 is an even number. Thus, the horizontal valid position detector 700 determines that it is a condition that no color inversion occurs, and outputs 0.

In FIG. 9B, the period in which the input Hsync is 0 is c, and the period between the rising of Hsync and the rising of DE is d+2. The counter 402 starts counting at the falling edge of Hsync, and counts up in each pixel clock cycle. Next, when the counter 402 stops counting at the rising edge of DE, the value of the counter 402 is c+d+2, and (c+d+2)/2 is an odd number. Thus, the horizontal valid position detector 700 determines that it is a condition that color inversion occurs, and outputs 1.

As such, even where the number of repetition is 2, whether or not a color-difference signal is inverted can be determined by counting number of the clock cycles in the period between the falling edge of Hsync and the rising edge of DE. While in this variation, an example has been described where the number of repetition is 2, this variation may be clearly implemented using the other number of repetition from the same point of view. Assume that the repetition information input from the controller 710 is N, where N is an integer of 0 or more. A value is obtained by dividing the value of the counter 402 in stopping at the rising edge of DE by 1 where the number of repetition is 0, and by N where the number is other than 0. The comparator 701 determines whether or not the color-difference signal is inverted based on whether the obtained value is an odd number or an even number.

Third Variation of Horizontal Valid Position Detector

Figure 10:
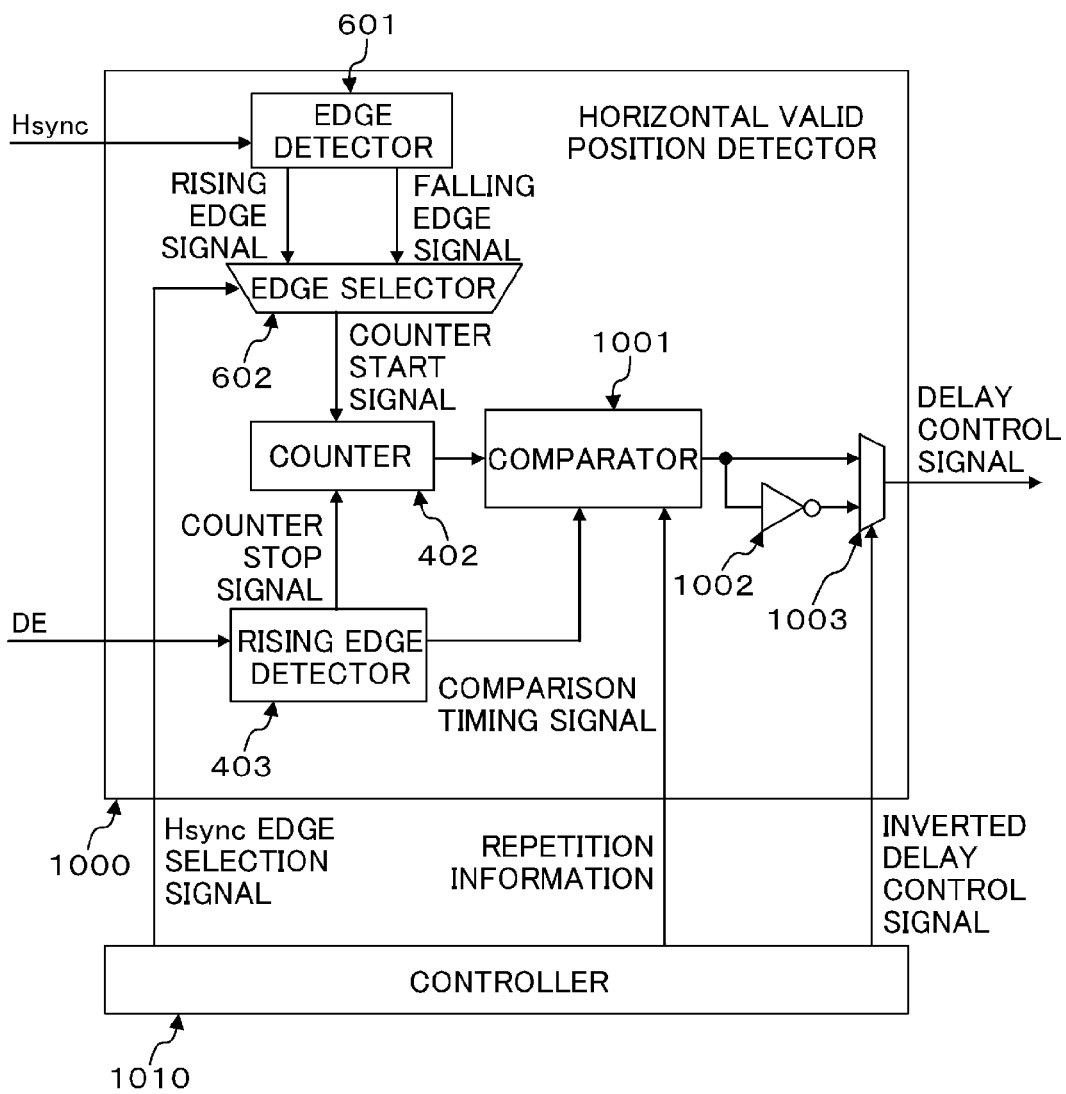
FIG. 10 illustrates an exemplary configuration of a third variation of the horizontal valid position detector according to the present disclosure.

A third variation of the horizontal valid position detector according to the present disclosure will be described below with reference to FIG. 10. FIG. 10 shows a controller 1010 in addition to a horizontal valid position detector 1000.

The horizontal valid position detector 1000 shown in FIG. 10 includes an inverting circuit 1002 inverting the detection result of a comparator 1001. The detection result of the comparator 1001 and the inversion result are input to a selector 1003. With an inverted delay control signal from the controller 1010, the selector 1003 controls which of the comparison result of the comparator 1001 and the inversion result is to be selected. This allows the CPU 103 to freely set the selector 1003. With this configuration, color-difference signals can be output to a display device in the order according to the HDMI standard, even if the video signal source 101 outputs the color-difference signals, for example, in the order of Cr, Cb, Cr, and Cb, which is reverse to the order according to the HDMI standard.

FIG. 10 shows the function of selecting an edge of Hsync, which has been described in the first variation of the horizontal valid position detector, and the function of inputting the number of repetition, which has been described in the second variation of the horizontal valid position detector. The above-described advantages may also be obtained without these functions.

First Variation of Synchronization Signal Delay Controller

A first variation of the synchronization signal delay controller according to this embodiment will be described below with reference to FIG. 11.

Figure 11:
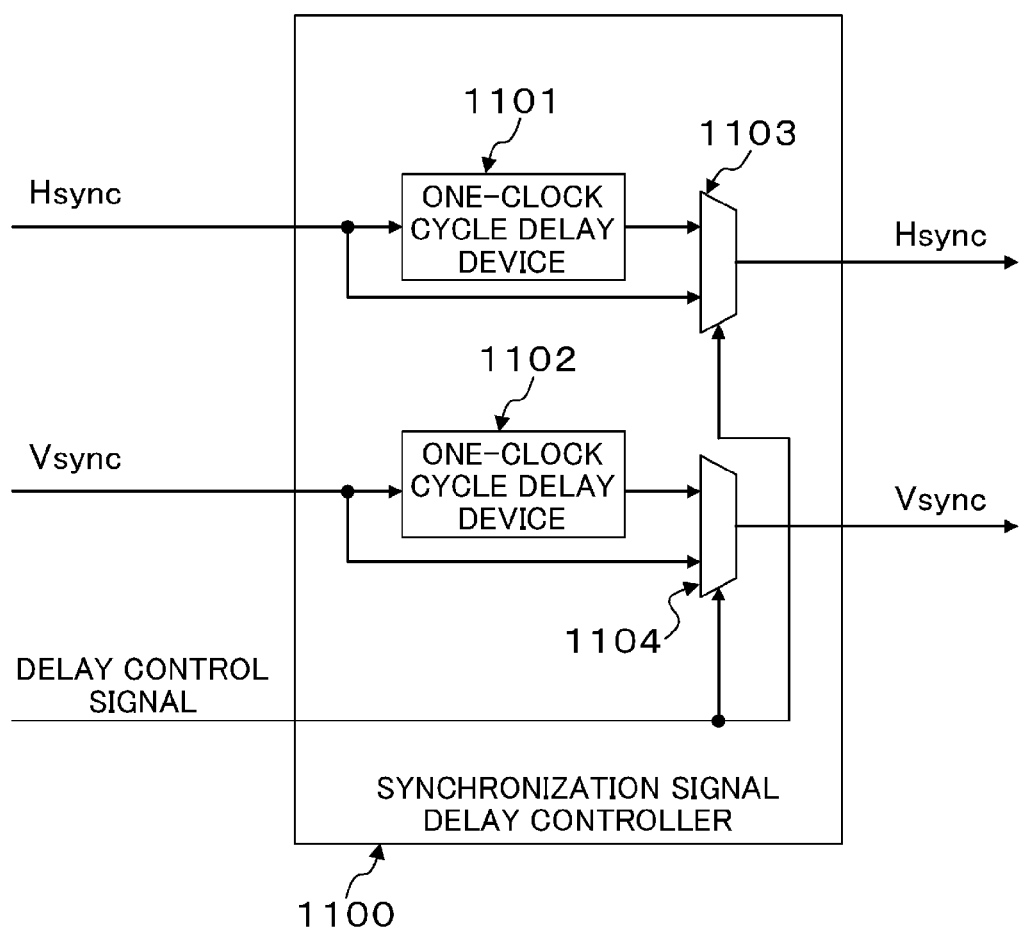
FIG. 11 illustrates an exemplary configuration of a first variation of the synchronization signal delay controller according to the first embodiment.

In FIG. 11, Hsync input to a synchronization signal delay controller 1100 is input to a one-clock cycle delay device 1101 to generate Hsync delayed by 1 clock cycle. Similarly, Vsync input to the synchronization signal delay controller 1100 is input to a one-clock cycle delay device 1102 to generate Vsync delayed by 1 clock cycle.

An Hsync selector 1103 selects the Hsync delayed by 1 clock cycle or the Hsync input to the synchronization signal delay controller 1100 in accordance with a delay control signal from the horizontal valid position detector. Similarly, a Vsync selector 1104 selects the Vsync delayed by 1 clock cycle or the Vsync input to the synchronization signal delay controller 1100 in accordance with a delay control signal from the horizontal valid position detector. The synchronization signals, which have been selected by the Hsync selector 1103 and the Vsync selector 1104, are input to a subsequent stage.

Second Variation of Synchronization Signal Delay Controller

Figure 12:
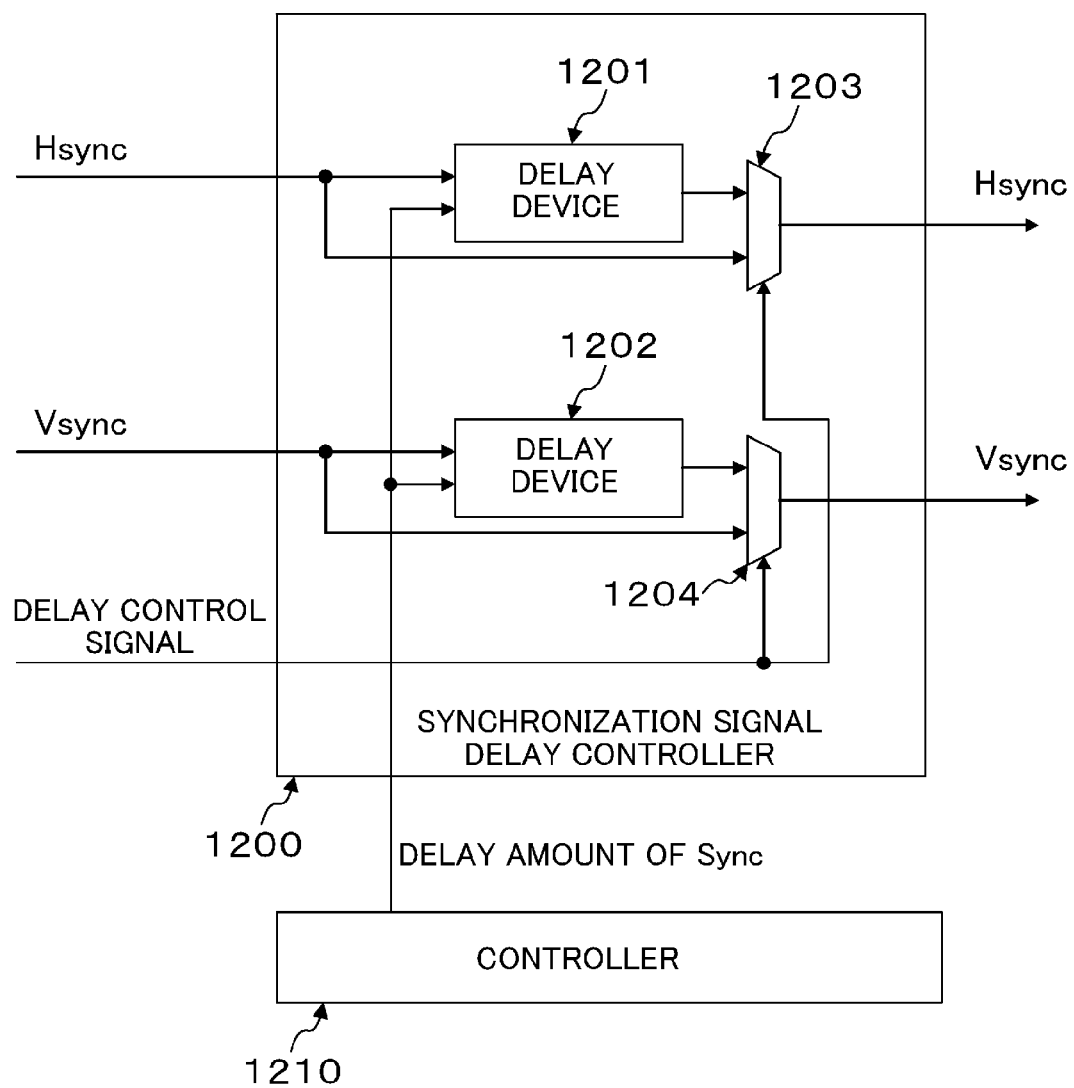
FIG. 12 illustrates an exemplary configuration of a second variation of the synchronization signal delay controller according to the first embodiment.

A second variation of the synchronization signal delay controller according to this embodiment will be described below with reference to FIG. 12. FIG. 12 shows a controller 1210 in addition to a synchronization signal delay controller 1200.

In FIG. 12, Hsync input to the synchronization signal delay controller 1200 is input to a delay device 1201 to generate Hsync delayed by a value set by the controller 1210. Similarly, Vsync is input to a delay device 1202 to generate Vsync delayed by a value set by the controller 1210.

An Hsync selector 1203 selects the delayed Hsync or the Hsync input to the synchronization signal delay controller 1200 in accordance with a delay control signal from the horizontal valid position detector. Similarly, a Vsync selector 1204 selects the delayed Vsync or the Vsync input to the synchronization signal delay controller 1200 in accordance with a delay control signal from the horizontal valid position detector. The synchronization signals selected by the Hsync selector 1203 and the Vsync selector 1204 are output to a subsequent stage.

This variation allows the CPU 103 to freely set a delay value through the controller 1210. For example, where color inversion occurs, a signal is delayed by 5 clock cycles, thereby shifting the range of image output to the left by 5 pixels. This prevents color inversion. That is, where it is a condition that color inversion occurs, the shift amount can be freely set. As a delay device, a memory element (e.g., an SRAM, a flip-flop, etc.) or a counter may be used for delaying the signals. The configuration of the delay device is not limited.

Third Variation of Synchronization Signal Delay Controller

Figure 13:
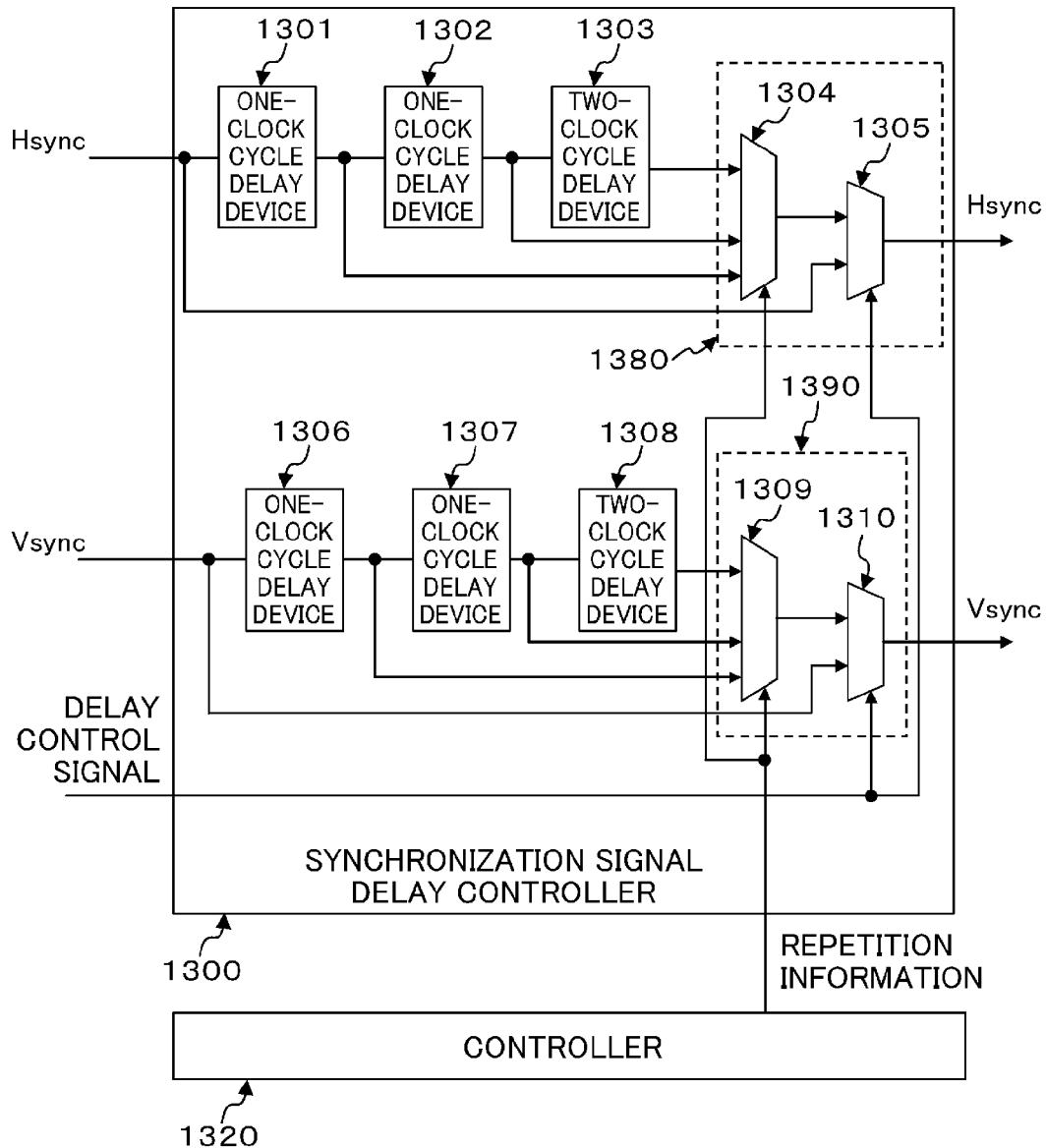
FIG. 13 illustrates an exemplary configuration of a third variation of the synchronization signal delay controller according to the first embodiment.

A third variation of the synchronization signal delay controller according to this embodiment will be described below with reference to FIG. 13. FIG. 13 shows a controller 1320 in addition to a synchronization signal delay controller 1300.

Color inversion can be prevented by delaying Sync by 1 clock cycle where the number of repetition is 0, by 2 clock cycles where the number of repetition is 2, and by 4 clock cycles where the number of repetition is 4.

Accordingly, in FIG. 13, Hsync input to the synchronization signal delay controller 1300 is input to a one-clock cycle delay device 1301 to generate Hsync delayed by 1 clock cycle. Moreover, the Hsync delayed by 1 clock cycle is input to a one-clock cycle delay device 1302 to generate Hsync delayed by 2 clock cycles. Furthermore, the Hsync delayed by 2 clock cycles is input to a two-clock cycle delay device 1303 to generate Hsync delayed by 4 clock cycles. The Hsyncs delayed by 1 clock cycle, 2 clock cycles, and 4 clock cycles are input to a selector 1304 included in a selection section 1380. The selector 1304 selects the Hsync delayed by 1 clock cycle where the number of repetition is 0, the Hsync delayed by 2 clock cycles where the number of repetition is 2, and the Hsync delayed by 4 clock cycles where the number of repetition is 4 based on the repetition information set by the controller 1320. Then, the selector 1304 inputs the selected signal to another selector 1305 included in the selection section 1380. The selector 1305 selects a signal based on a delay control signal. That is, where color inversion occurs, the selector 1305 selects the delayed Hsync from the selector 1304. Where no color inversion occurs, the selector 1305 selects the Hsync input to the synchronization signal delay controller 1300.

Similarly, Vsync input to the synchronization signal delay controller 1300 is input to a one-clock cycle delay device 1306 to generate Vsync delayed by 1 clock cycle. Moreover, the Vsync delayed by 1 clock cycle is input to a one-clock cycle delay device 1307 to generate Vsync delayed by 2 clock cycles. Furthermore, the Vsync delayed by 2 clock cycles is input to a two-clock cycle delay device 1308 to generate Vsync delayed by 4 clock cycles. Vsyncs delayed by 1 clock cycle, 2 clock cycles, and 4 clock cycles are input to a selector 1309 included in a selection section 1390. The selector 1309 selects the Vsync delayed by 1 clock cycle where the number of repetition is 0, the Vsync delayed by 2 clock cycles where the number of repetition is 2, and the Vsync delayed by 4 clock cycles where the number of repetition is 4, based on the repetition information set by the controller 1320. Then, the selector 1309 inputs the selected signal to another selector 1310 included in the selection section 1390. The selector 1310 selects a signal based on a delay control signal. That is, where color inversion occurs, the selector 1310 selects the delayed Vsync from the selector 1309. Where no color inversion occurs, the selector 1310 selects the Vsync input to the synchronization signal delay controller 1300.

As such, Sync is delayed by 1 clock cycle where the number of repetition is 0, by 2 clock cycles where the number of repetition is 2, and by 4 clock cycles where the number of repetition is 4. Therefore, color inversion can be prevented even if data is repeated a desired number of times.

Since the number of repetition is 0, 2, or 4 in general, an example has been described where the number of repetition is 0, 2, or 4 in this variation. The number is, however, not limited thereto.

While in the above-described example, the selection section 1380 includes the selectors 1304 and 1305 and the selection section 1390 includes the selectors 1309 and 1310, the present disclosure is not limited thereto. The selection section 1380 may include a multiplexer etc. selectively outputting one of the Hsyncs input to the synchronization signal delay controller 1300 and the Hsync delayed by 1, 2, or 4 clock cycles in accordance with the delay control signal and the repetition information set by the controller 1320. Similarly, the selection section 1390 may include a multiplexer etc. selectively outputting one of the Vsyncs input to the synchronization signal delay controller 1300 and the Vsync delayed by 1, 2, or 4 clock cycles in accordance with the delay control signal and the repetition information set by the controller 1320.

Second Embodiment

Figure 14:
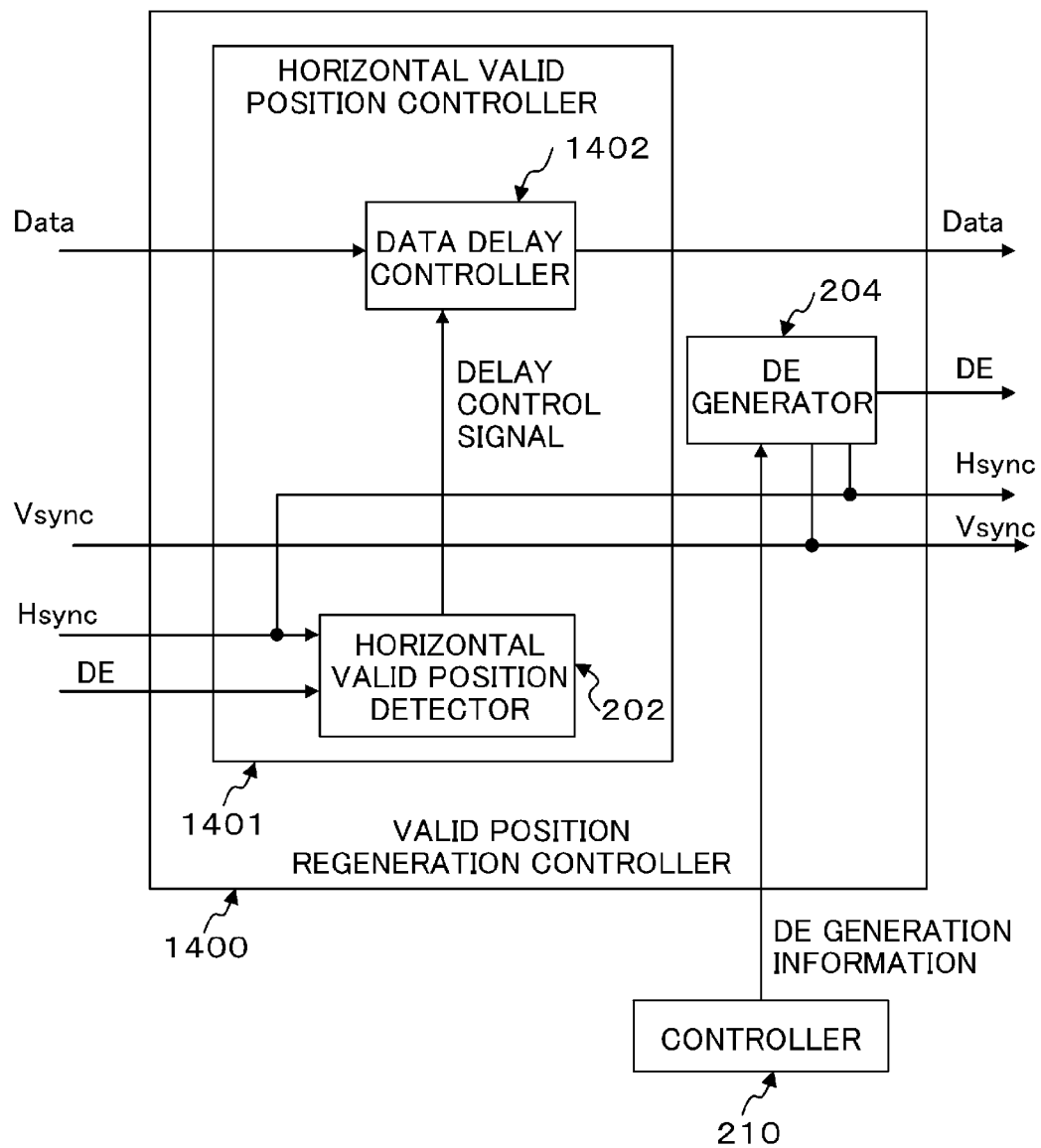
FIG. 14 illustrates an exemplary configuration of a valid position regeneration controller according to a second embodiment.

The valid position regeneration controller 111 of FIG. 1 according to a second embodiment is shown in FIG. 14 as a valid position regeneration controller 1400. FIG. 14 shows a controller 210 in addition to a valid position regeneration controller 1400. The valid position regeneration controller 1400 includes a horizontal valid position controller 1401. The horizontal valid position controller 1401 includes a horizontal valid position detector 202.

The horizontal valid position detector 202 calculates a valid pixel region of video data based on the relationship between Hsync and DE. Where the input video controller 110 outputs data having a valid pixel region different from the valid pixel region according to the CEA-861 standard, the horizontal valid position detector 202 determines whether or not it is time that color inversion occurs. The determination result is transmitted to the data delay controller 1402 as a delay control signal. The data delay controller 1402 delays input data based on the delay control signal.

That is, in the first embodiment, color inversion is prevented by shifting Sync where color inversion occurs. On the other hand, Sync is used as originally input and data is shifted in the second embodiment.

A DE generator 204 generates DE according to the CEA-861 standard in accordance with input Sync and outputs the DE to a subsequent stage.

Figure 15:
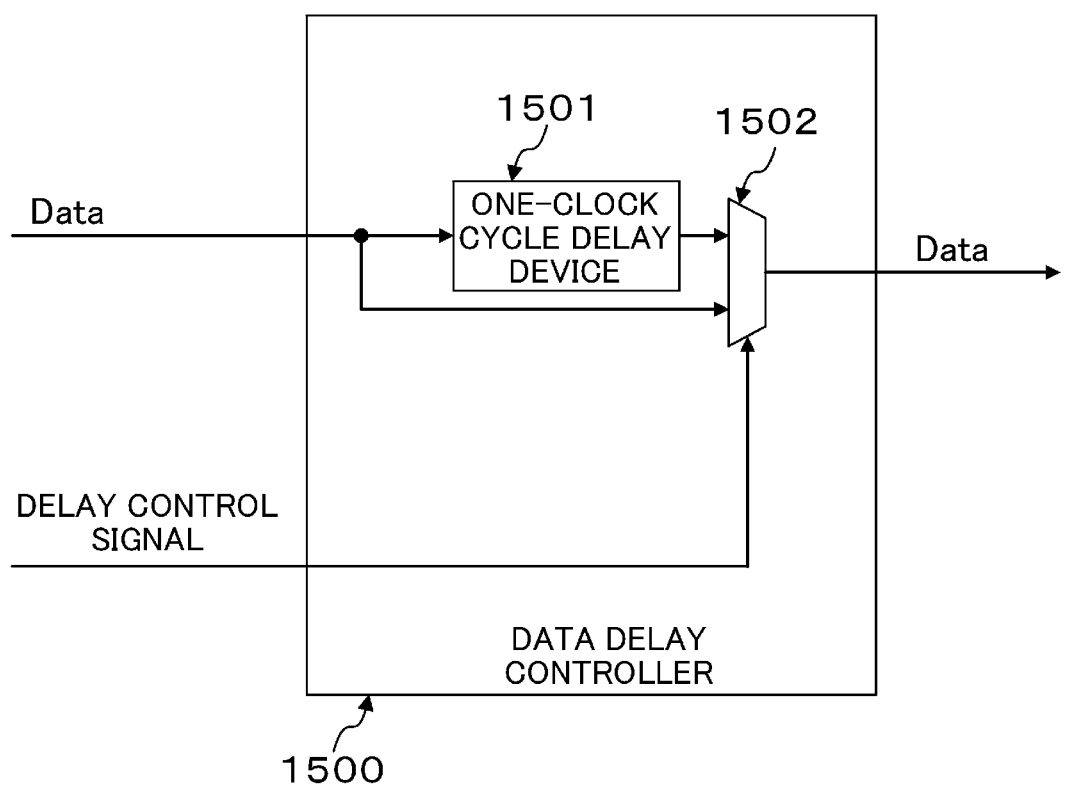
FIG. 15 illustrates an exemplary configuration of a data delay controller according to the second embodiment.

The data delay controller 1402 of FIG. 14 according to this embodiment is shown in FIG. 15 as a data delay controller 1500. The data delay controller 1500 includes a one-clock cycle delay device 1501 delaying input data by 1 clock cycle, and a data selector 1502 selecting the data delayed by 1 clock cycle or the data input to the data delay controller 1500 in accordance with the delay control signal from the horizontal valid position detector. The data selected by the data selector 1502 is input to a subsequent stage.

First Variation of Data Delay Controller

Figure 16:
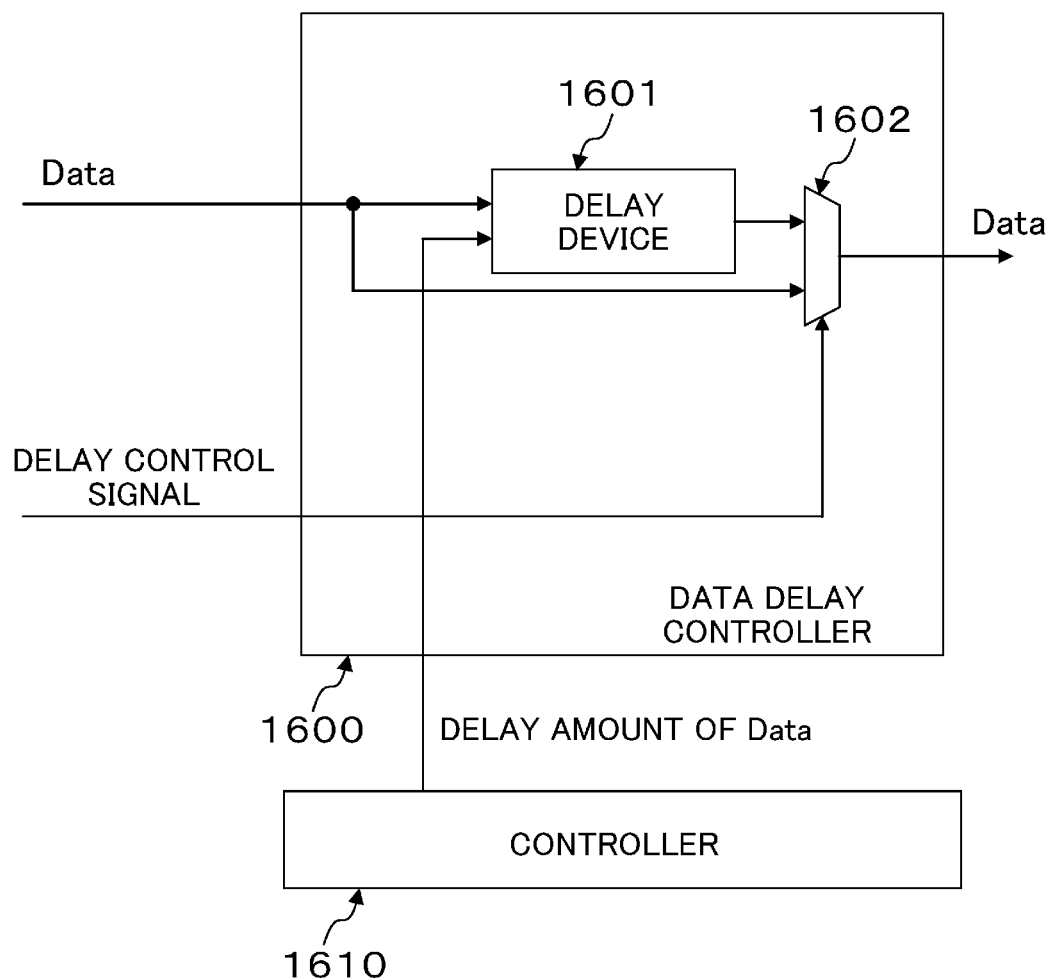
FIG. 16 illustrates an exemplary configuration of a data delay controller according to a first variation of the second embodiment.

A first variation of the data delay controller according to the present disclosure will be described below with reference to FIG. 16. FIG. 16 shows a controller 1610 in addition to a data delay controller 1600.

In the data delay controller 1600, input data is input to a delay device 1601. The delay device 1601 generates data by delaying the input data by the delay amount of Data set by the controller 1610. A data selector 1602 selects the delayed data or the data input to the data delay controller 1600 in accordance with a delay control signal input from the horizontal valid position detector. The data selected by the data selector 1602 is input to a subsequent stage.

This variation allows the CPU 103 to freely set a delay value through the controller 1610. For example, where color inversion occurs, data is delayed by 5 clock cycles, thereby shifting the range of image output to the right by 5 pixels. This prevents color inversion. That is, where it is a condition that color inversion occurs, the shift amount can be freely set. As the delay device 1601, an SRAM, a flip-flop, etc. may be used for delaying the signals, and the configuration of and delay device is not limited thereto.

Second Variation of Data Delay Controller

Figure 17:
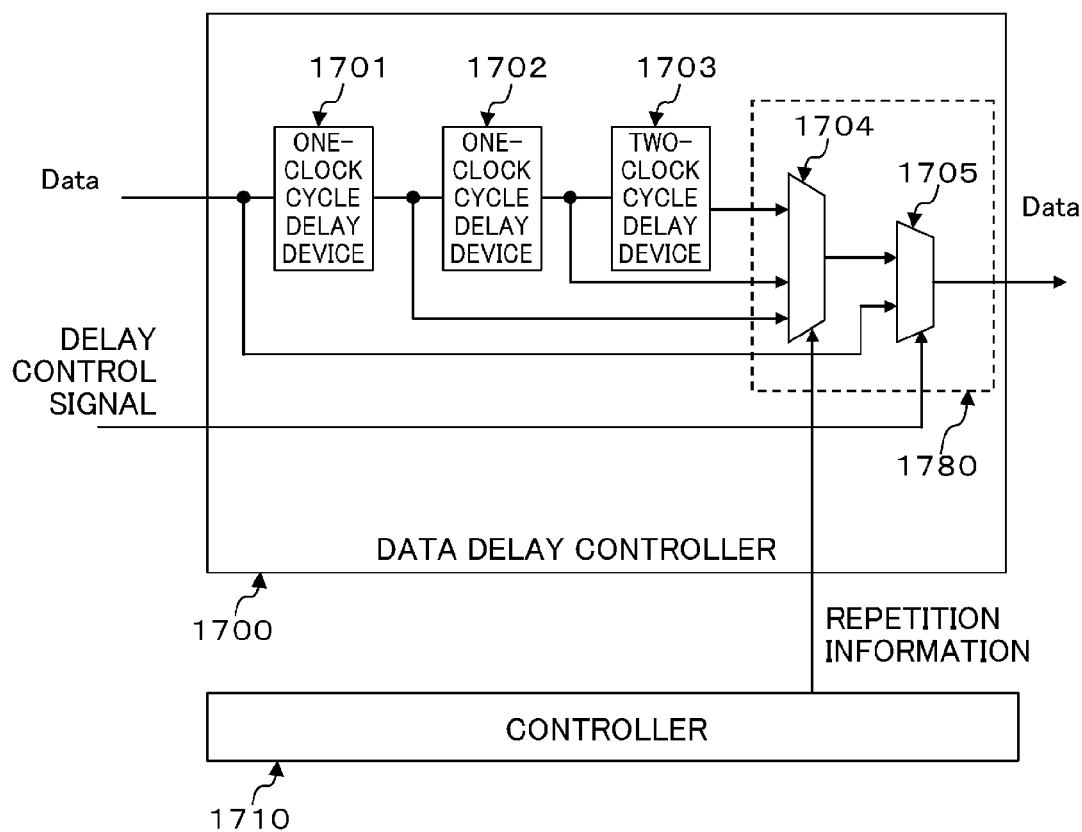
FIG. 17 illustrates an exemplary configuration of a data delay controller according to a second variation of the second embodiment.

A second variation of the data delay controller according to the present disclosure will be described below with reference to FIG. 17. FIG. 17 shows a controller 1710 in addition to a data delay controller 1700.

Color inversion can be prevented by delaying data by 1 clock cycle where the number of repetition is 0, 2 clock cycles where the number of repetition is 2, and 4 clock cycles where the number of repetition is 4.

Accordingly, in FIG. 17, data input to the data delay controller 1700 is input to a one-clock cycle delay device 1701 to generate data delayed by 1 clock cycle. Moreover, the data delayed by 1 clock cycle is input to a one-clock cycle delay device 1702 to generate data delayed by 2 clock cycles. Furthermore, the data delayed by 2 clock cycles is input to a two-clock cycle delay device 1703 to generate data delayed by 4 clock cycles. The data delayed by 1 clock cycle, 2 clock cycles, and 4 clock cycles are input to a selector 1704 included in a selection section 1780. The selector 1704 selects the data delayed by 1 clock cycle where the number of repetition is 0, the data delayed by 2 clock cycles where the number of repetition is 2, and the data delayed by 4 clock cycles where the number of repetition is 4 based on the repetition information set by the controller 1710. Then, the selector 1704 inputs the selected data to another selector 1705 included in the selection section 1780. The selector 1705 selects data based on a delay control signal. That is, where color inversion occurs, the selector 1705 outputs the delayed data from the selector 1704. Where no color inversion occurs, the selector 1705 outputs the data input to the data delay controller 1700.

As such, the data is delayed by 1 clock cycle where the number of repetition is 0, by 2 clock cycles where the number of repetition is 2, and by 4 clock cycles where the number of repetition is 4. Therefore, color inversion can be prevented even if data is repeated a desired number of times.

Since the number of repetition is 0, 2, or 4 in general, an example has been described where the number of repetition is 0, 2, or 4 in this variation. The number is, however, not limited thereto.

The number of repetition is also applicable to FIG. 16. Specifically, where the number of repetition is 0, the controller 1610 sets an amount of delay of 1 clock cycle. Where the number of repetition is 2, the controller 1610 sets an amount of delay of 2 clock cycles. Where the number of repetition is 4, the controller 1610 sets an amount of delay of 4 clock cycles.

While in the above-described example, the selection section 1780 includes the selectors 1704 and 1705, the present disclosure is not limited thereto. The selection section 1780 may include a multiplexer etc. selectively outputting one of the data input to the synchronization signal delay controller 1700 and the data delayed by 1, 2, or 4 clock cycles in accordance with a delay control signal and the repetition information set by the controller 1710.

Third Embodiment

Figure 18:
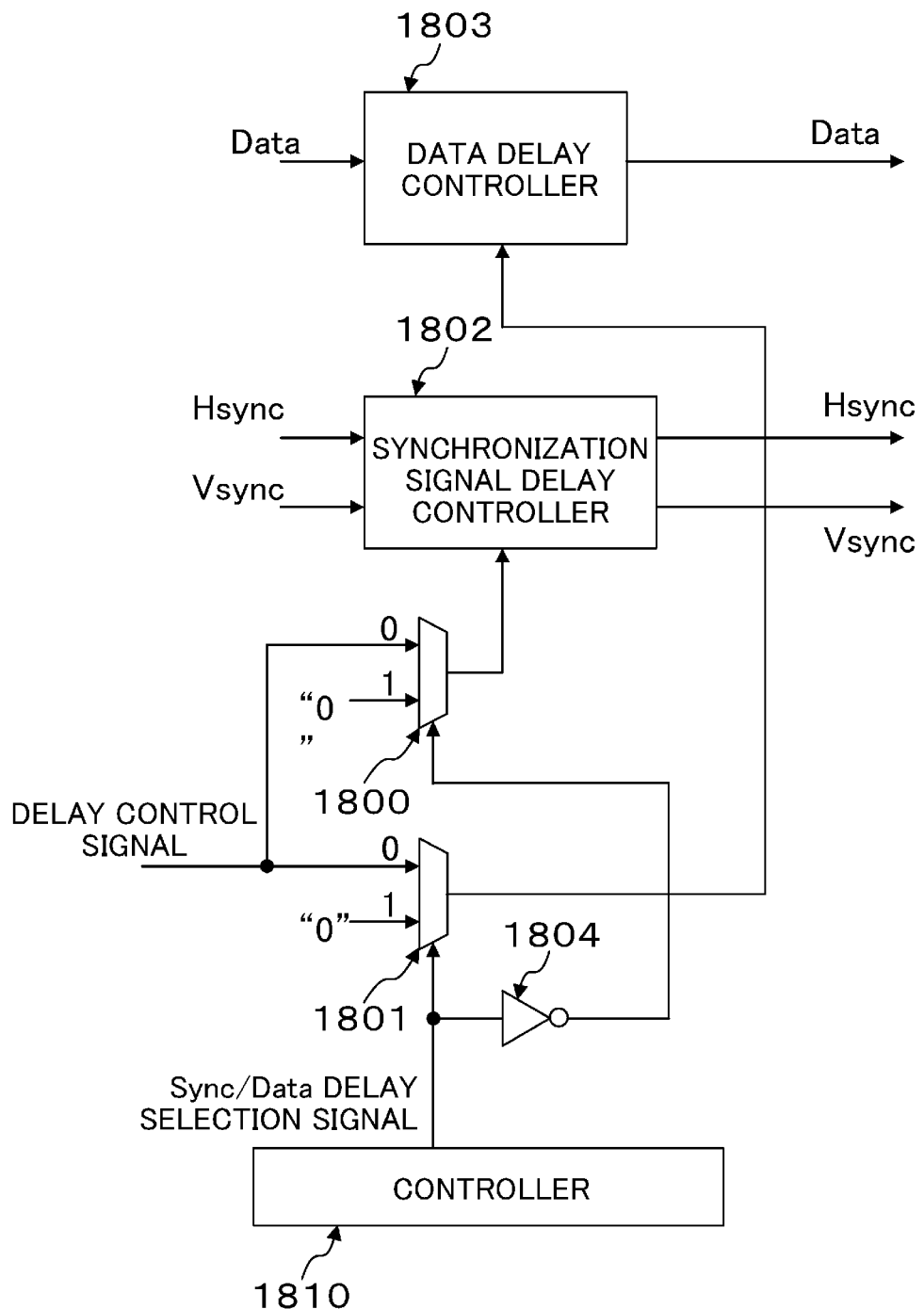
FIG. 18 illustrating an exemplary partial configuration of a valid position regeneration controller according to a third embodiment.

FIG. 18 illustrates a partial configuration of the valid position regeneration controller 111 of FIG. 1 according to a third embodiment, and a controller 1810. In FIG. 18, description of a horizontal valid position detector 202 and a DE generator 204 are omitted.

In the valid position regeneration controller according to this embodiment, a delay control signal input from the horizontal valid position detector is input to a selector 1800 and a selector 1801, and "0" is input to the selector 1800 and the selector 1801. An output of the selector 1800 is coupled to a synchronization signal delay controller 1802. An output of the selector 1801 is coupled to a data delay controller 1803.

The controller 1810 outputs a Sync/Data delay selection signal, which is input to the selector 1801. A signal obtained by inverting the Sync/Data delay selection signal at an inverting circuit 1804 is input to the selector 1800.

For example, where the Sync/Data delay selection signal is 0, 1 is input to the selector 1800, and 0 is input to the selector 1801. In this case, the selector 1800 outputs signal 0, and does not select any delay control signal. On the other hand, the selector 1801 selects the delay control signal. As a result, only the data delay controller 1803 operates.

On the contrary, where the Sync/Data delay selection signal is 1, 0 is input to the selector 1800, and 1 is input to the selector 1801. In this case, the selector 1800 selects the delay control signal. On the other hand, the selector 1801 outputs signal 0 and does not select the delay control signal. As a result, only the synchronization signal delay controller 1802 operates.

According to this embodiment, one of the functions of the synchronization signal delay controller 1802 or the data delay controller 1803 can be selected. For example, where the synchronization signal delay controller 1802 is used, an image is shifted to the left direction where color inversion occurs. On the other hand, where the data delay controller 1803 is used, the image is shifted to the right direction. That is, it can be freely set to which direction the image is shifted where color inversion occurs.

The synchronization signal delay controller 1802 and the data delay controller 1803 may be the synchronization signal delay controller and the data delay controller according to any of the first embodiment, the second embodiments, or their variations. In the third embodiment, the Sync/Data delay selection signal inverted by the inverting circuit 1804 is input to the selector 1800. However, the Sync/Data delay selection signal inverted by the inverting circuit 1804 may be input to the selector 1801, and the Sync/Data delay selection signal may be directly input to the selector 1800 from the controller 1810.

Fourth Embodiment

Figure 19:
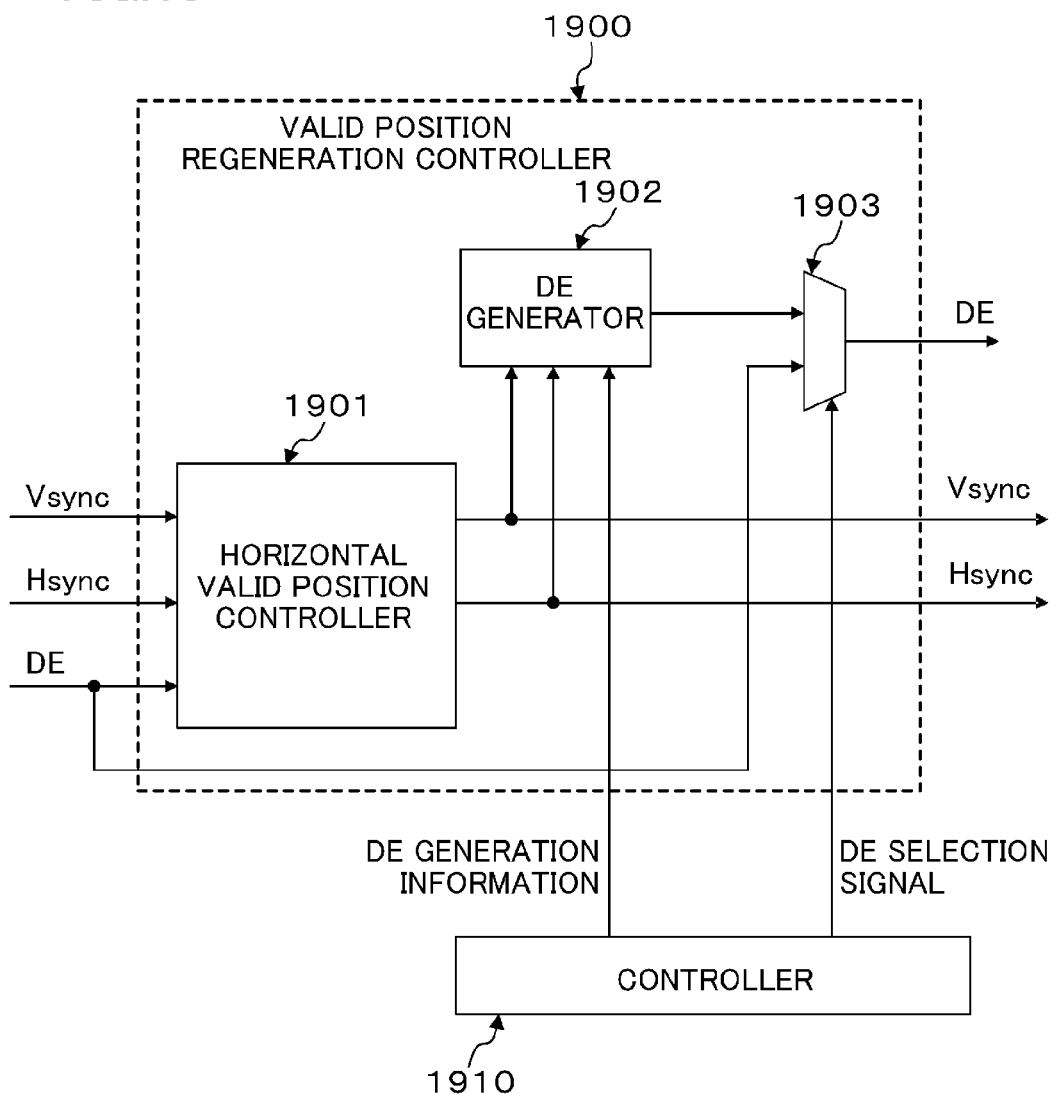
FIG. 19 illustrates an exemplary configuration of a valid position regeneration controller according to a fourth embodiment.

FIG. 19 illustrates a valid position regeneration controller 1900 and a controller 1910 according to a fourth embodiment. A horizontal valid position controller 1901 may have the configuration described in any one of the first embodiment or its variations. A DE generator 1902 corresponds to the DE generator 204 of the first embodiment.

Regenerated DE, which is output from the DE generator 1902, and DE input from a video signal source 101 are input to a selector 1903. A DE selection signal selecting the regenerated DE, which is output from DE generator 1902, or the DE input from the video signal source 101 is input to the selector 1903 from the controller 1910 so that the selector 1903 selects one of DEs. With this configuration, it can be freely selected which of the regenerated DE, which is output from DE generator 1902, and DE input from the video signal source 101 is to be used. Where DE according to the CEA-861 standard is input from the video signal source 101, the input DE is used without change to stop the operation of the DE generator 1902, thereby reducing power consumption.

Fifth Embodiment

Figure 20:
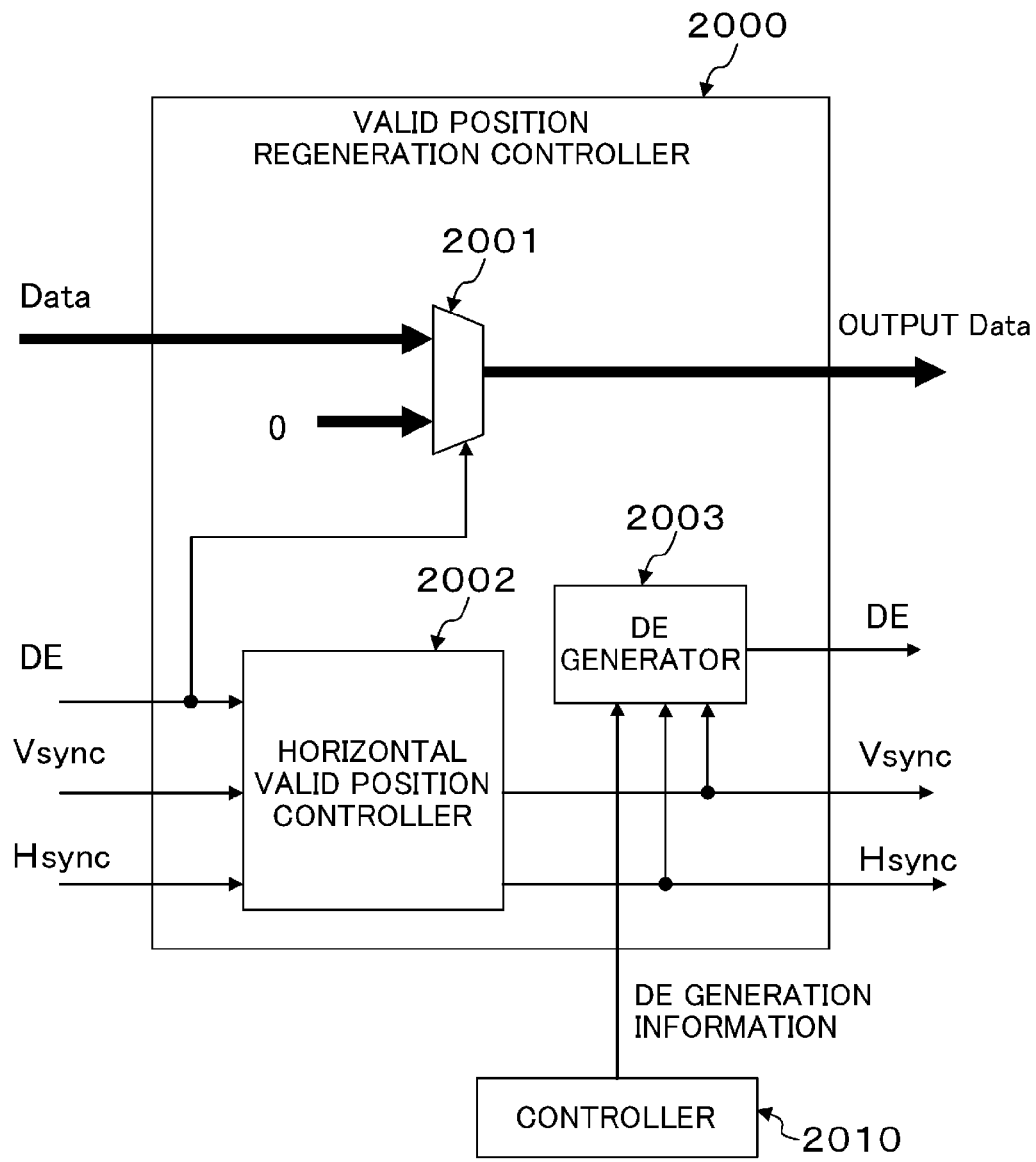
FIG. 20 illustrates an exemplary configuration of a valid position regeneration controller according to a fifth embodiment.

FIG. 20 illustrates a valid position regeneration controller 2000 according to a fifth embodiment. The valid position regeneration controller 2000 includes a selector 2001, a horizontal valid position controller 2002, and a DE generator 2003. The horizontal valid position controller 2002 may have the configuration described in any one of the first embodiment or its variations. The DE generator 2003 corresponds to the DE generator 204 of the first embodiment.

DE, which is the same as the DE input to the horizontal valid position controller 2002, is input to the selector 2001, and is used as a selection signal of output data. Where the DE input from a video signal source 101 is 1, the selector 2001 selects input data. Where the DE input from the video signal source 101 is 0, the selector 2001 outputs the data which is fixed to 0.

With this configuration, where data from the video signal source 101, which is out of the valid pixel region, is not fixed, the data out of the valid pixel region can be fixed to 0. This reduces output of an unnatural image at the ends of a display screen even if the valid pixel region is smaller than the CEA-861 standard.

Sixth Embodiment

Figure 21:
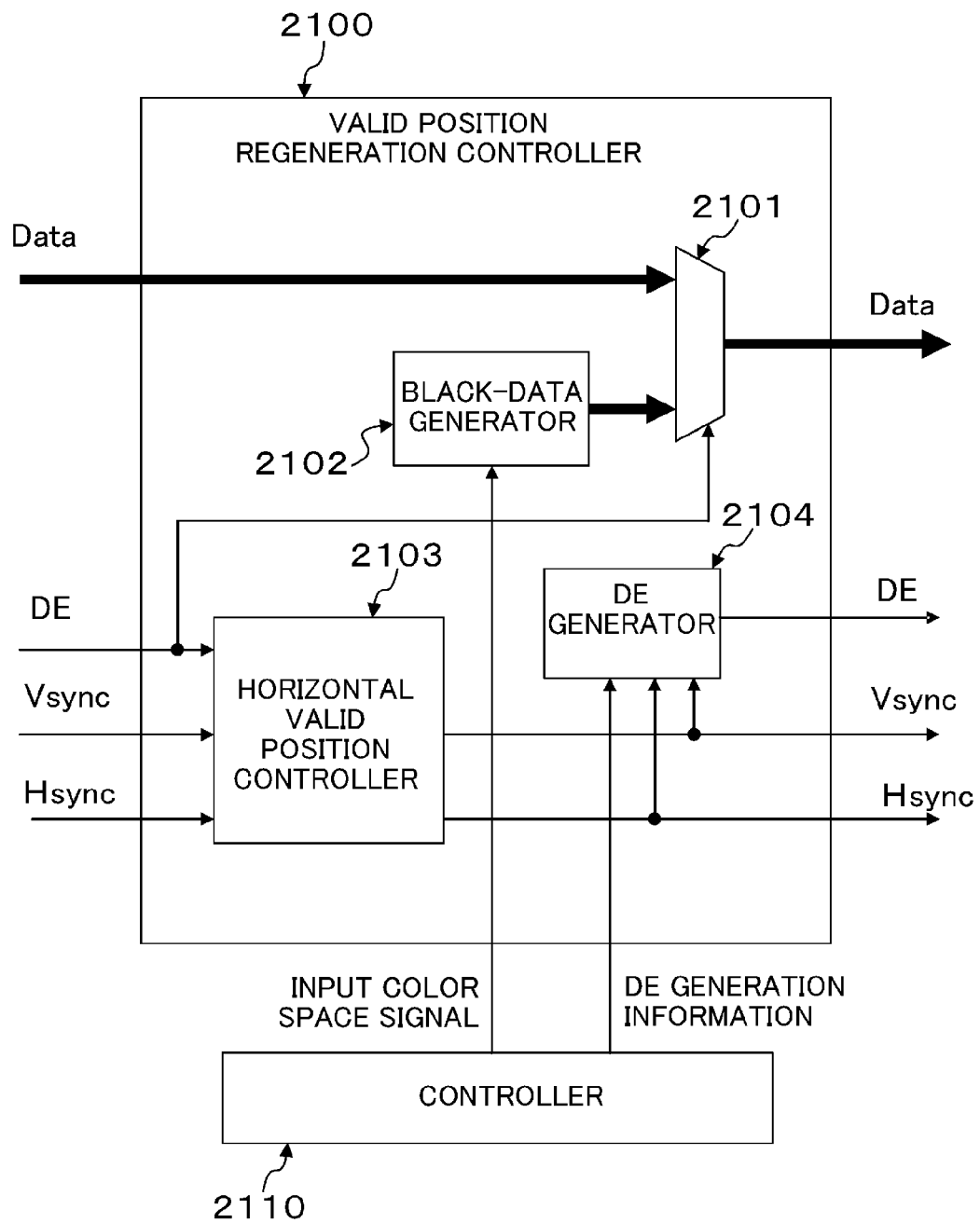
FIG. 21 illustrates an exemplary configuration of a valid position regeneration controller according to a sixth embodiment.

FIG. 21 illustrates a valid position regeneration controller 2100 according to a sixth embodiment. The valid position regeneration controller 2100 includes a selector 2101, a black-data generator 2102, a horizontal valid position controller 2103, and a DE generator 2104. A horizontal valid position controller 2103 may have the configuration described in any one of the first embodiment or its variations. The DE generator 2104 corresponds to the DE generator 204 of the first embodiment.

DE, which is the same as the DE input to the horizontal valid position controller 2103 is input to the selector 2101, and is used as a selection signal of output data. Where the DE input from the video signal source 101 is 1, the selector 2101 selects input data. Where the DE input from the video signal source 101 is 0, the selector 2101 selects output data of the black-data generator 2102. The data selected by the selector 2101 is output as output data of the valid position regeneration controller 2100.

The black-data generator 2102 outputs black data in an input color space based on an input color space signal input from a controller 2110. For example, where the input color space signal is represented by RGB, R=0, G=0, and B=0 are output. Where the input color space signal is represented by YCbCr 4:2:2 format, Y=0x10 and C=0x80 are output.

With this configuration, an image is output in black at the ends of a display screen to reduce output of an unnatural image, even if the valid pixel region of the data input from the video signal source 101 is smaller than the CEA-861 standard.

Seventh Embodiment

Figure 22:
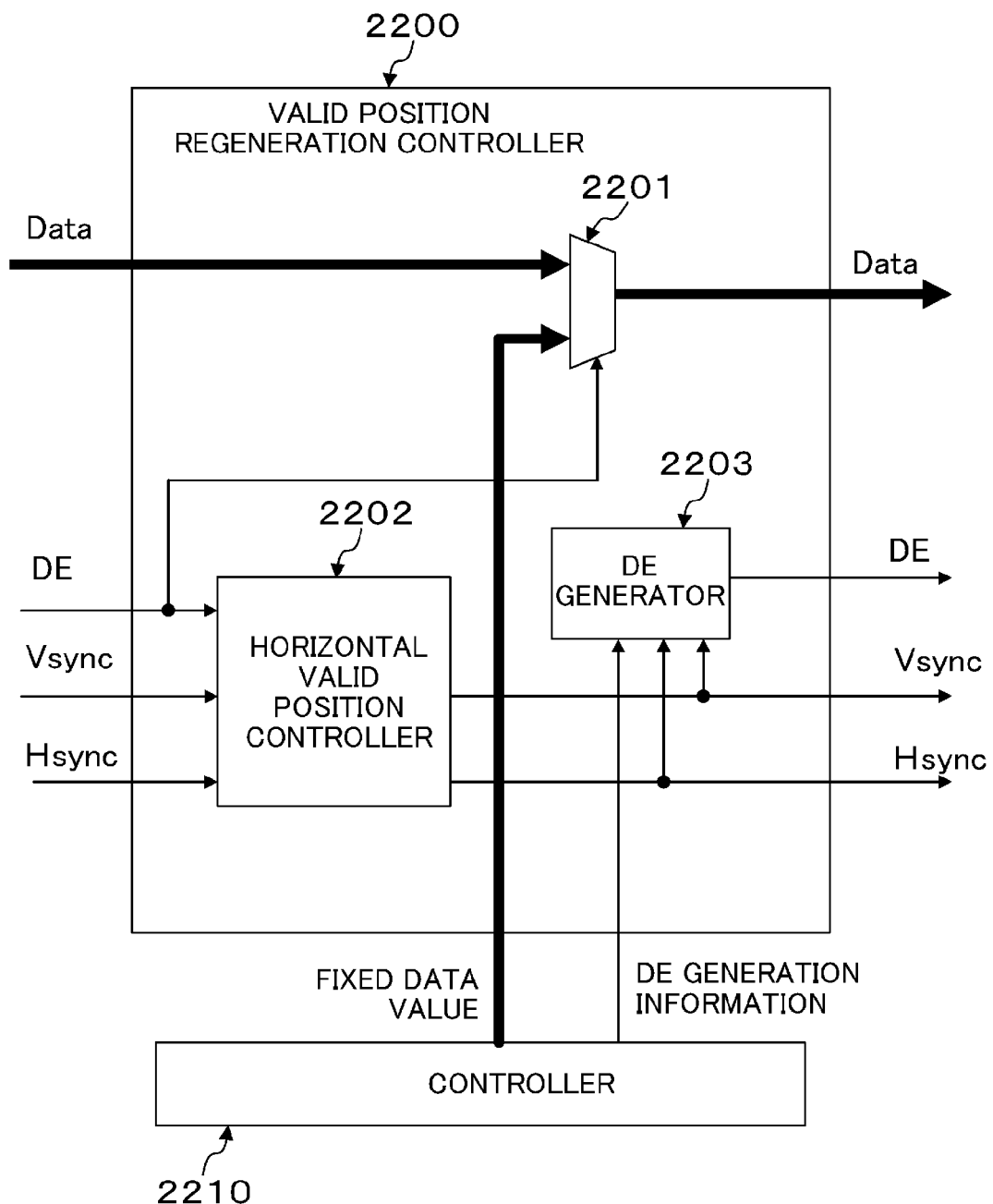
FIG. 22 illustrates an exemplary configuration of a valid position regeneration controller according to a seventh embodiment.

FIG. 22 illustrates a valid position regeneration controller 2200 according to a seventh embodiment. The valid position regeneration controller 2200 includes a selector 2201, a horizontal valid position controller 2202, and a DE generator 2203. The horizontal valid position controller 2202 may have the configuration described in any one of the first embodiment or its variations. The DE generator 2203 corresponds to the DE generator 204 of the first embodiment.

DE, which is the same as the DE input to the horizontal valid position controller 2202, is input to the selector 2201, and is used as a selection signal of output data. Where the DE input from the video signal source 101 is 1, the selector 2201 selects input data. Where the DE input from the video signal source 101 is 0, the selector 2201 outputs a fixed data value input from a controller 2210.

With this configuration, an image is output in a color of fixed data set by the controller 2210 at the ends of a display screen to reduce output of an unnatural image even if the valid pixel region of the data input from the video signal source 101 is smaller than the CEA-861 standard.

Eighth Embodiment

Figure 23:
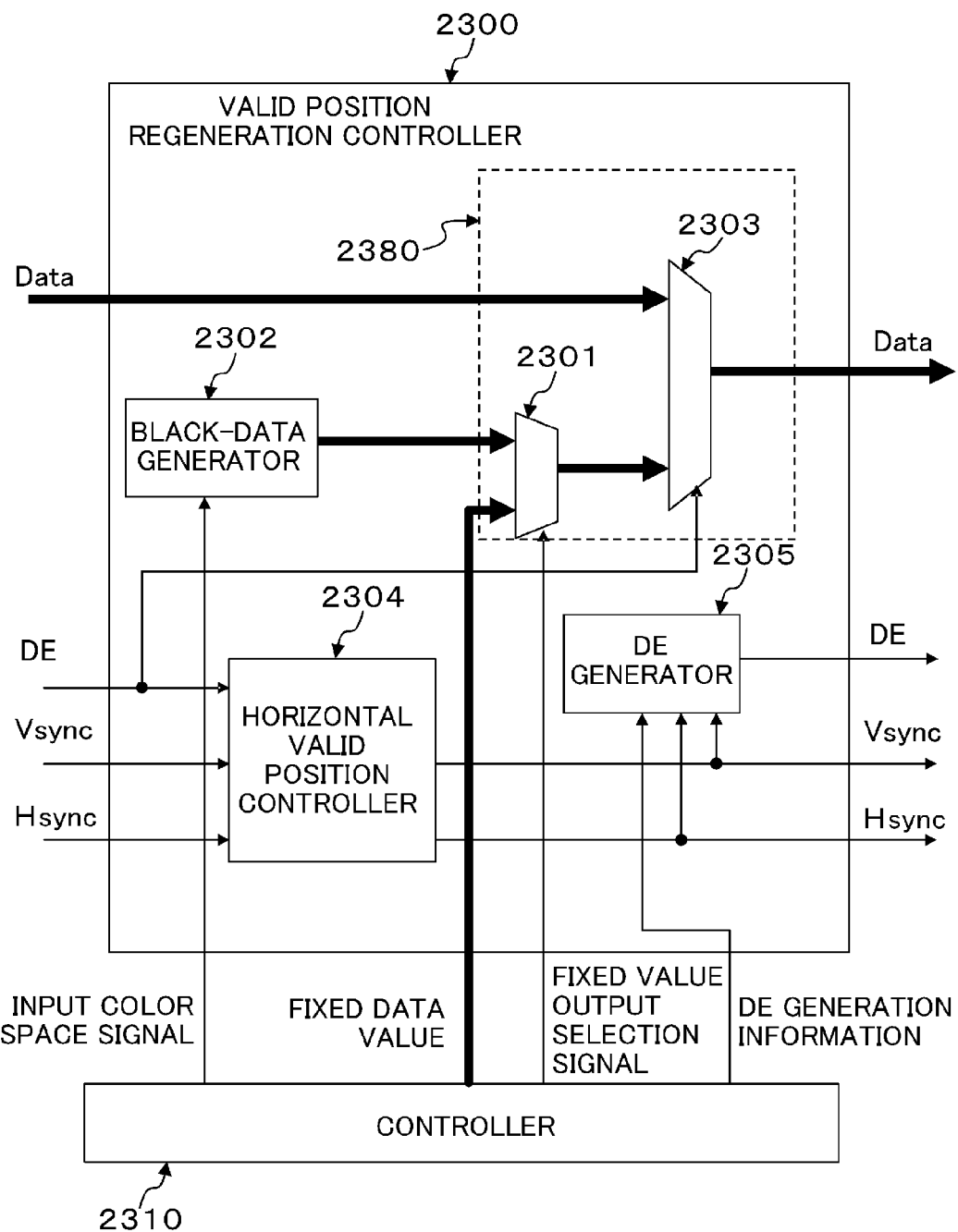
FIG. 23 illustrates an exemplary configuration of a valid position regeneration controller according to an eighth embodiment.

FIG. 23 illustrates a valid position regeneration controller 2300 according to an eighth embodiment. The valid position regeneration controller 2300 includes a selection section 2380, a black-data generator 2302, a horizontal valid position controller 2304, and a DE generator 2305. The selection section 2380 includes a selector 2301 and a selector 2303. The horizontal valid position controller 2304 may have the configuration described in any one of the first embodiment or its variations. The DE generator 2305 corresponds to the DE generator 204 of the first embodiment.

DE, which is the same as the DE input to the horizontal valid position controller 2304, is input to the selector 2303, and is used as a selection signal of output data. The selector 2301 selects black data output from the black-data generator 2302 or a fixed data value output from the controller 2310 based on the value of a fixed value output selection signal which is input from a controller 2310.

Where the DE input from the video signal source 101 is 1, the selector 2303 selects input data. Where the DE input from the video signal source 101 is 0, the selector 2303 selects the black data or the fixed data value, which is selected by the selector 2301. The data selected by the selector 2303 is output as output data of the valid position regeneration controller 2300.

How to output the black data from the black-data generator 2302 is similar to that in the black-data generator 2102 according to the sixth embodiment.

With this configuration, an image is output in a color of the set black data or the set fixed data at the ends of a display screen in accordance with the fixed value output selection signal of the controller 2310, thereby reducing output of an unnatural image even if the valid pixel region of the data input from the video signal source 101 is smaller than the CEA-861 standard. The CPU 103 freely outputs black data or a desired set value.

While in this embodiment, the selector 2301 receives the fixed data value from the controller 2310, the selector 2301 may select the black data output from the black-data generator 2302 or the fixed value input from an element other than the controller 2310.

While in the above-described example, the selection section 2380 includes the selectors 2301 and 2303, the present disclosure is not limited thereto. The selection section 2380 may include a multiplexer selectively outputting any one of the input data, the black data output from the black-data generator 2302, or the fixed data value input from the controller 2310 in accordance with the DE input from the video signal source 101 and the fixed value output selection signal which is input from the controller 2310.

Ninth Embodiment

FIG. 24 illustrates a valid position regeneration controller 2400 according to a ninth embodiment. The valid position regeneration controller 2400 includes selectors 2401 and 2403, an OR circuit 2402, a black data generator 2404, a horizontal valid position controller 2405, and a DE generator 2406. The horizontal valid position controller 2405 may have the configuration described in any one of the first embodiment or its variations. The DE generator 2406 corresponds to the DE generator 204 of the first embodiment.

DE, which is the same as the DE input to the horizontal valid position controller 2405, is input to the OR circuit 2402. Moreover, the OR circuit 2402 receives an output data fixing signal output from the controller 2410. That is, where 0 is output from the controller 2410 as the output data fixing signal, the DE input from the video signal source 101 is directly input to the selector 2401. Thus, the data selected by the selector 2301 is output from the valid position regeneration controller 2400 where the DE input from the video signal source 101 is 0. The data input from the video signal source 101 is output from the valid position regeneration controller 2400 where the DE input from the video signal source 101 is 1.

On the other hand, where 1 is output from the controller 2410 as the output data fixing signal, 1 is input to the OR circuit 2402, thereby inputting 1 to the selector 2401. Thus, the data input from the video signal source 101 is output from the valid position regeneration controller 2400 regardless of the DE input from the video signal source 101.

Assume that fixed data such as black data is output to a data region other than the valid pixel region of the data input from the video signal source 101. If there is no problem with direct outputting of the data at the ends of the display screen, the input data is directly output to stop the black-data generator 2302, thereby reducing power consumption.

While the present disclosure has been described using the HDMI transmission system as an example, the embodiments of the present disclosure are not particularly limited to the HDMI standard. In the embodiments, with respect to the determination by the selectors, the output results in response to the input of 0 and 1 may be reversed. This does not influence the result of the implementation of the present disclosure.

Other implementations are contemplated.

As described above, the first to ninth embodiments have been described as example techniques disclosed in the present application. However, the techniques according to the present disclosure are not limited to these embodiments, but are also applicable to those where modifications, substitutions, additions, and omissions are made. In addition, elements described in the first to ninth embodiments may be combined to provide a different embodiment.

Various embodiments have been described above as example techniques of the present disclosure, in which the attached drawings and detailed description are provided.

As such, elements illustrated in the attached drawings or detailed description may include not only essential elements for solving the problem, but also non-essential elements for solving the problem in order to illustrate such techniques. Thus, the mere fact that those non-essential elements are shown in the attached drawings or detailed description should not be interpreted as requiring that such elements is essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A video processor receiving, from a video signal source, original video data including color-difference data formed by alternately arranging first and second color-difference signals, an original synchronization signal indicating synchronization timing of the original video data, and an original data valid region signal indicating a valid pixel region of the original video data, supplementing insufficient part of the original video data relative to a predetermined valid pixel region, and outputting new video data having the predetermined valid pixel region, and a new data valid region signal indicating the predetermined valid pixel region; the video processor comprising:
 a valid position regeneration controller configured to delay at least one of the original video data or the original synchronization signal to match data positions of the first and second color-difference signals in the original video data to data positions of first and second color-difference signals in the new video data in determining based on the original synchronization signal and the original data valid region signal that the first and second color-difference signals in the new video data are displayed while being replaced with each other; and
 a controller configured to control operation of the valid position regeneration controller.

2. The video processor of claim 1, wherein the valid position regeneration controller includes
 a horizontal valid position detector configured to calculate the valid pixel region of the original video data based on the original synchronization signal and the original data valid region signal, to generate a delay control signal based on a relationship between a calculated valid pixel region of the original video data and the predetermined valid pixel region, and to output the delay control signal, and at least one of a synchronization signal delay controller configured to delay the original synchronization signal based on the delay control signal, or a data delay controller configured to delay the original video data based on the delay control signal.

3. The video processor of claim 2, wherein
the valid position regeneration controller includes a DE generator configured to generate a data valid region signal based on a synchronization signal delayed by the synchronization signal delay controller where the synchronization signal delay controller is included, and based on the original synchronization signal where the synchronization signal delay controller is not included.

4. The video processor of claim 3, wherein
the valid position regeneration controller includes a selector configured to select one of the original data valid region signal or the data valid region signal generated by the DE generator.

5. The video processor of claim 4, wherein
the controller is configured to output to the selector, a DE selection signal indicating which of the original data valid region signal or the data valid region signal generated by the DE generator is to be selected.

6. The video processor of claim 2, wherein
the horizontal valid position detector includes
  a synchronization signal edge detector configured to detect an edge of the original synchronization signal, and to output a counter start signal as a detection result,
  a data valid region signal edge detector configured to detect an edge of the original data valid region signal, and to output a counter stop signal as a detection result, and
  a counter configured to start counting in response to the counter start signal, and to stop counting in response to the counter stop signal.

7. The video processor of claim 6, wherein
the synchronization signal edge detector includes
  an edge detector configured to detect a rising edge and a falling edge of the original synchronization signal, and to output a rising edge signal and a falling edge signal in response to the rising edge and the falling edge, respectively, and
  an edge selector configured to select the rising edge signal or the falling edge signal in response to an edge selection signal from the controller, to detect the rising edge or the falling edge of the original synchronization signal in response to a selected rising or falling edge signal, and to output the counter start signal as a detection result.

8. The video processor of claim 6, wherein
the horizontal valid position detector includes a comparator configured to receive, from the data valid region signal edge detector, a comparison timing signal as an edge detection result of the original data valid region signal, and to determine whether or not a count value of the counter is a predetermined value when the comparison timing signal is received, and
the comparator is configured to output the delay control signal in response to a comparison result of the count value.

9. The video processor of claim 8, wherein
the comparator is configured to determine whether or not the count value of the counter is an odd number.

10. The video processor of claim 8, wherein
the comparator is configured to receive, from the controller, repetition information indicating for how many clock cycles the original video data is repeated, and to determine based on the repetition information whether or not the count value of the counter is the predetermined value when the comparison timing signal is received.

11. The video processor of claim 8, wherein
the horizontal valid position detector includes
  an inverting circuit configured to invert the delay control signal, and
  a comparison selector configured to select one of a comparison result of the comparator or a comparison result inverted by the inverting circuit in response to an inverted delay control signal from the controller.

12. The video processor of claim 2, wherein
the synchronization signal delay controller includes
  a delay device configured to delay an input synchronization signal, and
  a synchronization signal selector configured to select one of a synchronization signal input to the synchronization signal delay controller or a synchronization signal delayed by the delay device in accordance with the delay control signal from the horizontal valid position detector.

13. The video processor of claim 12, wherein
the delay device is configured to delay the input synchronization signal in accordance with an amount of delay set by the controller.

14. The video processor of claim 2, wherein
the synchronization signal delay controller includes
  a plurality of delay devices configured to delay an input synchronization signal, and
  a selection section configured to receive, from the controller, repetition information indicating for how many clock cycles the original video data is repeated, and to select one of a delayed synchronization signal output from one of the plurality of delay devices or a synchronization signal input to the synchronization signal delay controller in accordance with the repetition information and the delay control signal from the horizontal valid position detector.

15. The video processor of claim 2, wherein
the data delay controller includes
  a delay device configured to delay input video data, and
  a video data selector configured to select one of video data input to the data delay controller or video data delayed by the delay device in accordance with the delay control signal from the horizontal valid position detector.

16. The video processor of claim 15, wherein
the delay device is configured to delay the input video data in accordance with an amount of delay set by the controller.

17. The video processor of claim 2, wherein
the data delay controller includes
  a plurality of delay devices configured to delay input video data, and
  a selection section configured to receive, from the controller, repetition information indicating for how many clock cycles the original video data is repeated, and selecting one of delayed video data output from one of the plurality of delay devices or video data input to the data delay controller in accordance with the repetition information and the delay control signal from the horizontal valid position detector.

18. The video processor of claim 2, wherein
the controller is configured to output a delay selection signal indicating that the original synchronization signal is delayed by the synchronization signal delay controller, or that the original video data is delayed by the data delay controller, and
one of the synchronization signal delay controller or the data delay controller, which has been selected by the delay selection signal, operates.

19. The video processor of claim 18, wherein
the valid position regeneration controller includes
a first selector configured to select whether or not to input the delay control signal to the synchronization signal delay controller in accordance with the delay selection signal, and
a second selector configured to select whether or not to input the delay control signal to the data delay controller in accordance with the delay selection signal.

20. The video processor of claim 19, wherein
the valid position regeneration controller includes an inverting circuit configured to invert the delay selection signal input to the first selector, and to input an inverted delay selection signal to the second selector.

21. The video processor of claim 19, wherein
the valid position regeneration controller includes an inverting circuit configured to invert the delay selection signal input to the second selector, and to input an inverted delay selection signal to the first selector.

22. The video processor of claim 2, wherein
the valid position regeneration controller includes a selector configured to select one of video data delayed by the data delay controller or a predetermined fixed value where the data delay controller is included, and one of the original video data or the predetermined fixed value where the data delay controller is not included, in accordance with the data valid region signal.

23. The video processor of claim 22, wherein
the controller is configured to output the predetermined fixed value.

24. The video processor of claim 2, wherein
the valid position regeneration controller includes
a black data generator configured to output black data, and
a selector configured to select one of video data delayed by the data delay controller or the black data where the data delay controller is included, and one of the original video data or the black data where the data delay controller is not included, in accordance with original data valid region signal.

25. The video processor of claim 24, wherein
the controller is configured to output an input color space signal to the black data generator, and
the black data generator is configured to generate the black data based on the input color space signal.

26. The video processor of claim 2, wherein
the valid position regeneration controller includes
a black data generator configured to output black data, and
a selection section configured to receive, from the controller, a fixed value output selection signal indicating which of the black data or a predetermined fixed value is to be selected, and to select any one of video data delayed by the data delay controller, the black data, or the predetermined fixed value where the data delay controller is included, and any one of the original video data, the black data, or the predetermined fixed value where the data delay controller is not included, based on the fixed value output selection signal and the original data valid region signal.

27. The video processor of claim 26, wherein
the controller is configured to output the predetermined fixed value.

28. The video processor of claim 26, wherein
the controller is configured to output an input color space signal to the black data generator, and
the black data generator is configured to generate the black data based on the input color space signal.

29. The video processor of claim 2, wherein
the valid position regeneration controller includes
a black data generator configured to output black data,
a first selector configured to receive, from the controller, a fixed value output selection signal indicating which of the black data or a predetermined fixed value is to be selected, and to select one of the black data or the predetermined fixed value based on the fixed value output selection signal,
a calculator configured to perform calculation based on the original data valid region signal and an output data fixing signal output from the controller, and
a second selector configured to select one of video data delayed by the data delay controller or an output of the first selector where the data delay controller is included, and one of the original video data or the output of the first selector where the data delay controller is not included, in accordance with a calculation result of the calculator.

30. The video processor of claim 29, wherein
the controller is configured to output the predetermined fixed value.

31. The video processor of claim 29, wherein
the controller is configured to output an input color space signal to the black data generator, and
the black data generator is configured to generate the black data based on the input color space signal.

* * * * *